(12) United States Patent
Takeda et al.

(10) Patent No.: US 11,237,717 B2
(45) Date of Patent: Feb. 1, 2022

(54) INFORMATION PROCESSING DEVICE AND INFORMATION PROCESSING METHOD

(71) Applicant: SONY CORPORATION, Tokyo (JP)

(72) Inventors: Yasuhiro Takeda, Tokyo (JP); Takeshi Fujiki, Tokyo (JP); Junichiro Takagi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/768,950

(22) PCT Filed: Aug. 4, 2016

(86) PCT No.: PCT/JP2016/073014
§ 371 (c)(1),
(2) Date: Apr. 17, 2018

(87) PCT Pub. No.: WO2017/077751
PCT Pub. Date: May 11, 2017

(65) Prior Publication Data
US 2018/0300037 A1 Oct. 18, 2018

(30) Foreign Application Priority Data
Nov. 4, 2015 (JP) .............................. JP2015-216617

(51) Int. Cl.
*G06F 3/0486* (2013.01)
*G06F 13/00* (2006.01)
(Continued)

(52) U.S. Cl.
CPC .......... *G06F 3/0486* (2013.01); *G06F 3/0482* (2013.01); *G06F 3/0488* (2013.01);
(Continued)

(58) Field of Classification Search
CPC .... G06F 3/0481; G06F 3/0482; G06F 3/0483; G06F 3/04817; G06F 3/0486;
(Continued)

(56) References Cited

U.S. PATENT DOCUMENTS 7,139,983 B2 *  11/2006  Kelts ..................... G06F 3/0481
                                                715/802
8,941,707 B2 *   1/2015  Setton ..................... H04L 51/00
                                                348/14.01
(Continued)

FOREIGN PATENT DOCUMENTS

JP   2002-297798 A    10/2002
JP   2014-044655 A     3/2014
(Continued)

OTHER PUBLICATIONS

International Search Report and Written Opinion of PCT Application No. PCT/JP2016/073014, dated Oct. 4, 2016, 6 pages.
(Continued)

*Primary Examiner* — Arpan P. Savla
*Assistant Examiner* — Erik V Stitt
(74) *Attorney, Agent, or Firm* — Chip Law Group

(57) ABSTRACT

There is provided an information processing device that includes a communication unit that acquires a moving image being subjected to live distribution as well as manipulation information including a manipulation position concerning location of a sticker on the moving image being displayed on a display unit of a device and information concerning the sticker to be located. The information processing device further includes a control unit that analyzes a region corresponding to the manipulation position on the moving image, and performs processing of locating the sticker on the moving image on a basis of an analysis result and the manipulation information.

17 Claims, 23 Drawing Sheets

(51) Int. Cl.
*H04N 21/472* (2011.01)
*H04N 21/44* (2011.01)
*H04N 21/4788* (2011.01)
*G06F 3/0488* (2013.01)
*G06F 3/0482* (2013.01)
*G06F 3/0484* (2013.01)

(52) U.S. Cl.
CPC ...... *G06F 3/04842* (2013.01); *G06F 3/04845* (2013.01); *G06F 13/00* (2013.01); *H04N 21/44008* (2013.01); *H04N 21/4788* (2013.01); *H04N 21/47205* (2013.01)

(58) Field of Classification Search
CPC ........ G06F 9/4443; G06F 9/543; G06F 17/24; G06F 13/00; G06F 3/04842; G06F 3/04845; G06F 3/0488; H04N 5/44543; H04N 21/47205; H04N 21/44008; H04N 21/4788
See application file for complete search history.

(56) References Cited

U.S. PATENT DOCUMENTS

| | | | | |
|---|---|---|---|---|
| 8,989,786 | B2* | 3/2015 | Feghali | H04W 4/14 455/466 |
| 9,007,465 | B1* | 4/2015 | Fontanez | H04N 7/147 348/159 |
| 9,639,969 | B1* | 5/2017 | Wilson | G06T 11/60 |
| 2002/0018067 | A1* | 2/2002 | Carcia | G06T 13/205 345/473 |
| 2002/0040372 | A1* | 4/2002 | Ide | G06Q 30/02 715/205 |
| 2008/0122796 | A1* | 5/2008 | Jobs | H04M 1/72522 345/173 |
| 2009/0132924 | A1* | 5/2009 | Vasa | H04N 5/76 715/723 |
| 2010/0181375 | A1* | 7/2010 | Lapstun | H04N 1/00244 235/375 |
| 2010/0257210 | A1* | 10/2010 | Witkin | G06Q 30/00 707/802 |
| 2011/0016408 | A1* | 1/2011 | Grosz | G06K 9/6267 715/745 |
| 2011/0022992 | A1* | 1/2011 | Zhou | G06T 13/40 715/863 |
| 2011/0248992 | A1* | 10/2011 | van Os | G06T 13/40 345/419 |
| 2013/0141513 | A1* | 6/2013 | Setton | H04L 51/00 348/14.01 |
| 2014/0096041 | A1* | 4/2014 | Gowen | G06F 3/1242 715/753 |
| 2014/0300635 | A1* | 10/2014 | Suzuki | G06T 11/00 345/633 |
| 2014/0365949 | A1* | 12/2014 | Xia | G06K 9/00436 715/780 |
| 2015/0116448 | A1* | 4/2015 | Gottlieb | H04N 21/44008 348/14.03 |
| 2015/0172246 | A1* | 6/2015 | Velummylum | H04L 51/08 709/206 |
| 2015/0194186 | A1* | 7/2015 | Lee | H04N 5/232945 386/224 |
| 2015/0334075 | A1* | 11/2015 | Wang | G07C 13/00 715/752 |
| 2015/0339706 | A1* | 11/2015 | Tew | G06Q 30/0251 705/14.49 |
| 2016/0133295 | A1* | 5/2016 | Boyle | G11B 27/322 386/240 |
| 2016/0334972 | A1* | 11/2016 | Cheng | G06F 40/166 |
| 2018/0012390 | A1* | 1/2018 | Deng | H04N 5/23219 |
| 2018/0048864 | A1* | 2/2018 | Taylor | G06Q 20/40145 |
| 2018/0314409 | A1* | 11/2018 | Adilipour | G06F 16/54 |

FOREIGN PATENT DOCUMENTS

| | | |
|---|---|---|
| JP | 2015-073175 A | 4/2015 |
| JP | 2015-100039 A | 5/2015 |
| WO | 2015/072195 A1 | 5/2015 |

OTHER PUBLICATIONS

Office Action for JP Patent Application No. 2020-169358, dated Nov. 2, 2021, 05 pages of English Translation and 05 pages of Office Action.

* cited by examiner

FIG. 12
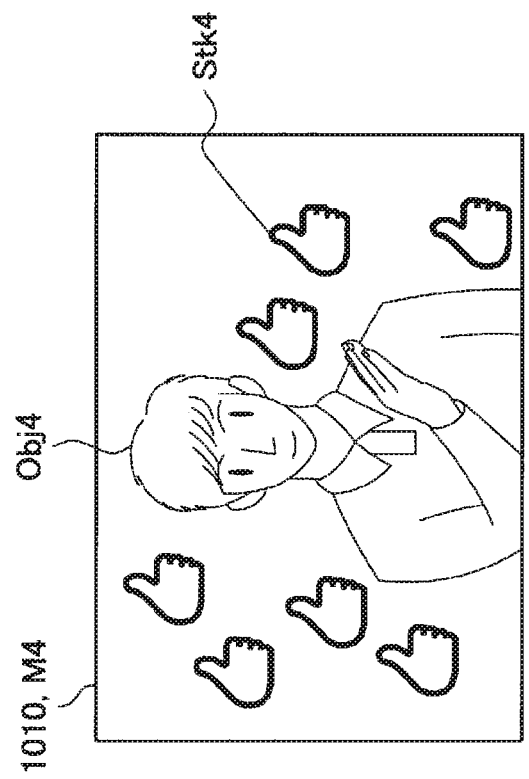
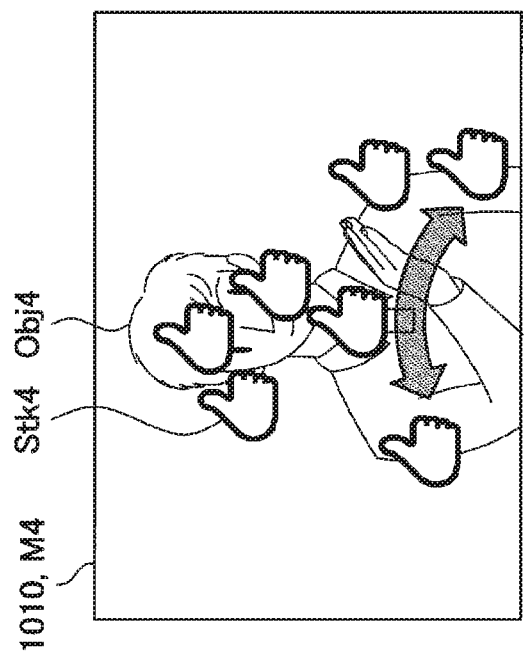

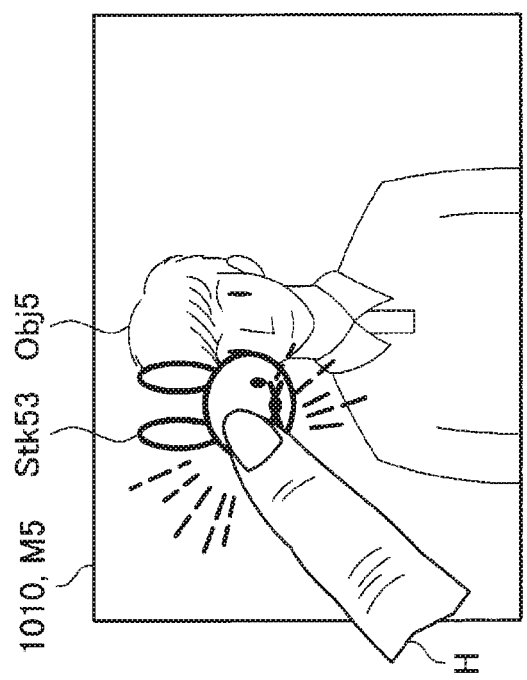
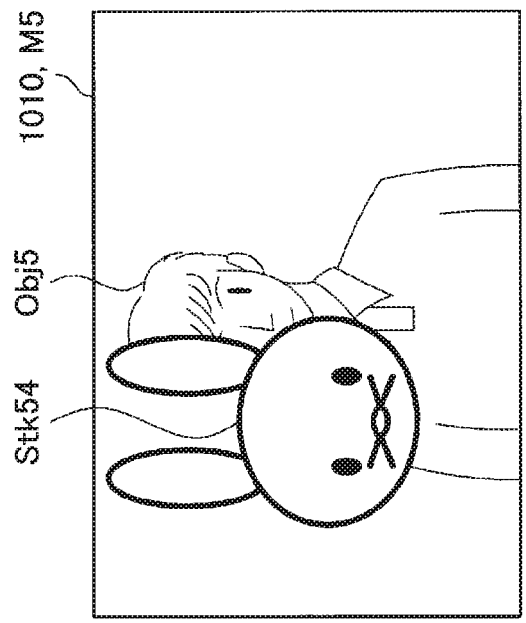
FIG. 16

FIG. 22

| STICKER | NUMBER OF TIMES OF MANIPULATIONS |
|---------|----------------------------------|
| Like    | 124                              |
| CAT     | 450                              |
| HEART   | 210                              |
| FOOD    | 23                               |
| ...     | ...                              |

1100

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2016/073014 filed on Aug. 4, 2016, which claims priority benefit of Japanese Patent Application No. JP 2015-216617 filed in the Japan Patent Office on Nov. 4, 2015. Each of the above-referenced applications is hereby incorporated herein by reference in its entirety.

TECHNICAL FIELD

The present disclosure relates to an information processing device, an information processing method, and a program.

BACKGROUND ART

In recent years, a live distribution technology of distributing live video captured by a terminal having an imaging function, such as a smartphone, to a plurality of viewers is being developed. For example, Patent Literature 1 below discloses a technology for properly controlling supply of video from an imaging device that captures live video.

CITATION LIST

Patent Literature

Patent Literature 1: JP 2002-297798A

DISCLOSURE OF INVENTION

Technical Problem

According to the technology disclosed in Patent Literature 1 above, video is distributed unilaterally from a distribution user to viewers. However, means for making communication from viewers to the distribution user is not disclosed. For example, in a case where the distribution user and a plurality of viewers make communication using communication means (for example, a chat function, a comment function, or the like) provided separately from live video, it takes time to input comments or the like, so that communication may not proceed smoothly. Therefore, it has been requested to promote communication between users such that real-time performance in video being distributed is not compromised.

Thus, the present disclosure proposes an information processing device, an information processing method, and a program being novel and improved that can make communication between users through a moving image being distributed smoother.

Solution to Problem

According to the present disclosure, there is provided an information processing device including: a communication unit configured to acquire a moving image being subjected to live distribution as well as manipulation information including a manipulation position concerning location of a sticker on the moving image being displayed on a display unit of a device and information concerning the sticker to be located; and a control unit configured to analyze a region corresponding to the manipulation position on the moving image, and perform processing of locating the sticker on the moving image on a basis of an analysis result and the manipulation information.

In addition, according to the present disclosure, there is provided an information processing method including: by a processor, acquiring a moving image being subjected to live distribution; acquiring manipulation information including a manipulation position concerning location of a sticker on the moving image being displayed on a display unit of a device and information concerning the sticker to be located; analyzing a moving image corresponding to the manipulation position on the moving image; and performing processing of locating the sticker on the moving image on a basis of the analysis result and the manipulation information.

In addition, according to the present disclosure, there is provided a program causing a computer to execute: generating display information for causing a received moving image being subjected to live distribution to be displayed on a display unit of the computer; generating manipulation information to be transmitted to a server by controlling a communication unit of the computer, the manipulation information including a manipulation position concerning location of a sticker on the moving image and information concerning the sticker to be located; and generating display information for causing a moving image received from the server by controlling the communication unit to be displayed on the display unit, the moving image having been subjected by the server to processing of locating the sticker on a basis of an analysis result obtained by analyzing a region on the moving image corresponding to a manipulation position acquired by the server from a device including the computer and the manipulation information.

Advantageous Effects of Invention

According to the present invention as described above, it is possible to make communication between users through a moving image being distributed smoother.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 12 is a diagram showing an example of gesture processing by an object included in a moving image performed by the information processing system according to the embodiment.

FIG. 16 is a diagram showing an example of processing based on a tap manipulation on a sticker performed by the information processing system according to the embodiment.

FIG. 22 is a diagram for describing movie attribute estimation processing performed by the information processing system according to the embodiment.

MODE(S) FOR CARRYING OUT THE INVENTION

Figure 1:
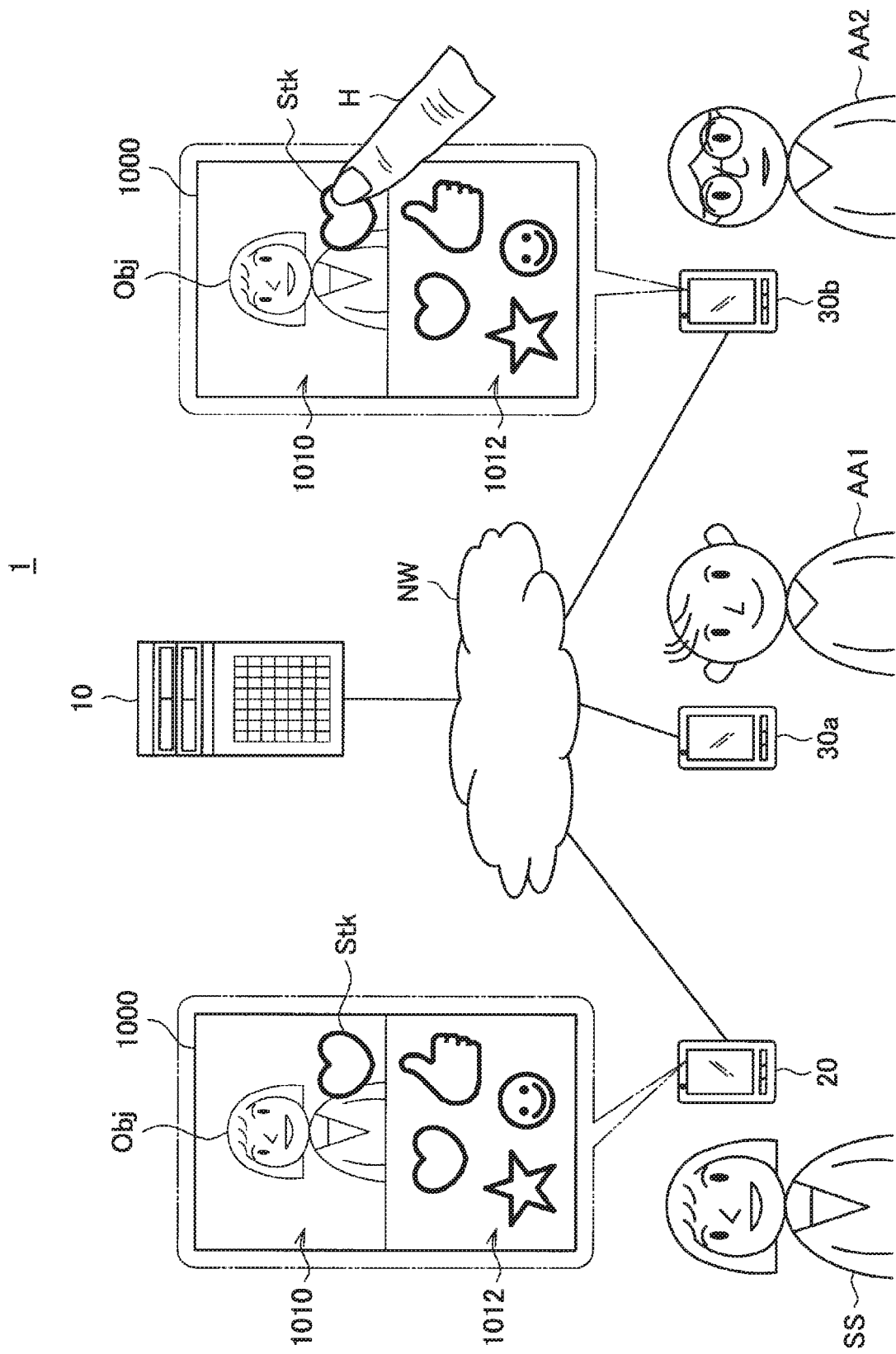
FIG. 1 is a diagram showing an overview of a configuration of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.

1. Overview of information processing system
2. Configuration of each device
3. Operation of information processing system
4. Example of image processing performed by information processing system
5. Example of application of manipulation information performed by information processing system
6. Hardware configuration example
7. Summary <<1. Overview of Information Processing System>>
<1.1. Configuration of Information Processing System>

FIG. 1 is a diagram showing an overview of a configuration of an information processing system 1 according to an embodiment of the present disclosure. As shown in FIG. 1, the information processing system 1 includes a server 10, a user terminal 20, and a user terminal 30 (30a, 30b, . . . ). The server 10, the user terminal 20, and the user terminal 30 are connected by every kind of wired or wireless network NW.

The server 10 is an example of an information processing device. The server 10 includes one or more information processing devices on the network. The information processing devices included in the server 10 may include a processing circuit and a communication device. For example, the server 10 may process a moving image (for example, live video) received from the user terminal 20 using the communication device, using the processing circuit on the basis of manipulation information acquired from the user terminal 20 or the user terminal 30, and may transmit the processed moving image to each user terminal by the communication device.

The user terminal 20 (30) is an example of an information processing device. In FIG. 1, a smartphone is shown as an example of the user terminal 20 (30), whilst the user terminal 20 (30) may include another device such as a tablet, a personal computer, a recorder, a game console, or a wearable device. The user terminal 20 (30) may include a processing circuit, a communication device, and an output/input device. For example, the user terminal 20 (30) receives a moving image from the server 10 using the communication device, and outputs the moving image using the output/input device. In addition, the user terminal 20 (30) may acquire a manipulation on a moving image being displayed on the output/input device, and may transmit information concerning the manipulation to the server 10 using the communication device. Note that the user terminal 20 (30) may have an imaging function for imaging real space and generating a moving image. The moving image generated by the imaging function of the user terminal 20 (30) may be transmitted to the server 10, and may be distributed to each user terminal by the server 10.

In the example shown in FIG. 1, the user terminal 20 captures live video through a manipulation of a distribution user SS, and the captured live video is distributed to the user terminal 30 after being subjected to predetermined processing by the server 10. Viewing users AA1 and AA2 can view the distributed live video through the user terminal 30.

Further, the user terminal 30 having acquired the live video can make an instruction to perform predetermined processing to the live video by a predetermined manipulation by a user on a touch panel on which the live video is being displayed. The instruction is transmitted to the server 10. The server 10 performs predetermined processing corresponding to the acquired instruction on the live video, and distributes the live video after the processing to each user terminal. Accordingly, live video based on a manipulation by any viewing user is displayed on each user terminal.

Describing more specifically, a display screen 1000 is displayed on display units of the user terminal 20, the user terminal 30*a*, and the user terminal 30*b*, as shown in FIG. 1. The display screen 1000 includes a live video display screen 1010 and a sticker selection screen 1012. Live video including an object Obj of a distributor SS is being displayed on the live video display screen 1010. For example, the user AA2 selects a heart-shaped sticker Stk from the sticker selection screen 1012 using a manipulating body H, and performs a manipulation so as to locate the sticker Stk at any position on the live video display screen 1010. The user terminal 30*b* having acquired the manipulation transmits an instruction related to processing corresponding to the manipulation to the server 10. The server 10 acquires the instruction, performs processing corresponding to the instruction, and distributes live video after the processing to each user terminal. Then, live video in a state where the sticker Stk has been located is displayed on the display unit of the user terminal 20, for example. In addition, although not illustrated in FIG. 1, live video in a state where the sticker Stk has been located is also displayed similarly on the display unit of the user terminal 30*a* of the viewing user AA1.

Note that a manipulation concerning the user terminal 30 performed on the live video display screen 1010 as described above can also be performed concerning the user terminal 20 which is a distribution source.

In this manner, by perform a manipulation such as locating a sticker on live video being distributed, a viewing user (or a distribution user) can easily make communication with a plurality of users in real time while viewing the live video. Consequently, communication between users through live video becomes smoother.

<1.2. Terminal UI Example>

A configuration and manipulation processing of a user interface (UI) displayed on the display manipulation unit of the user terminal 30 (20) will be described in detail with reference to FIG. 2 to FIG. 4.

Figure 2:
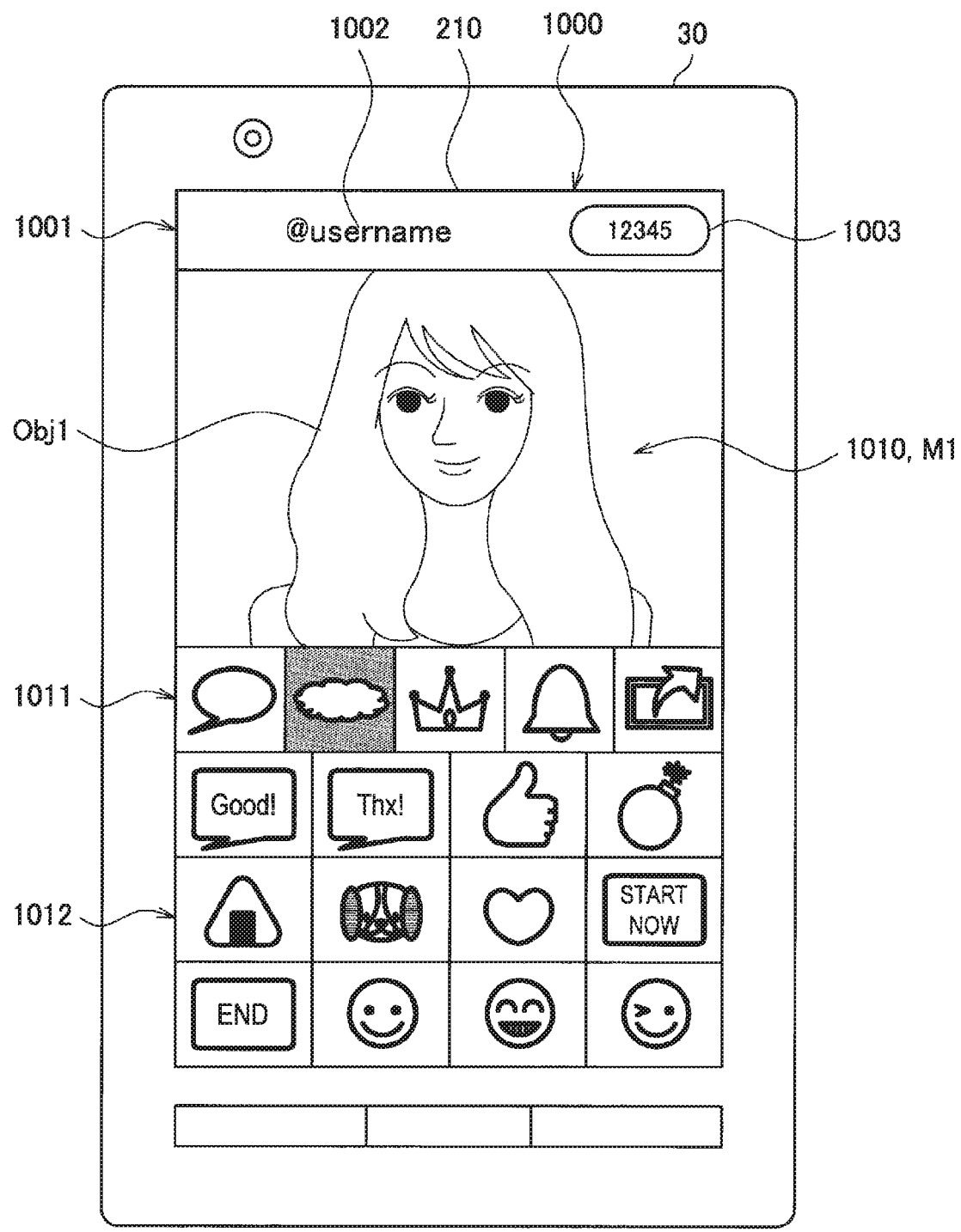
FIG. 2 is a diagram showing an example of a configuration of a UI displayed on a display manipulation unit of a user terminal.
Figure 3:
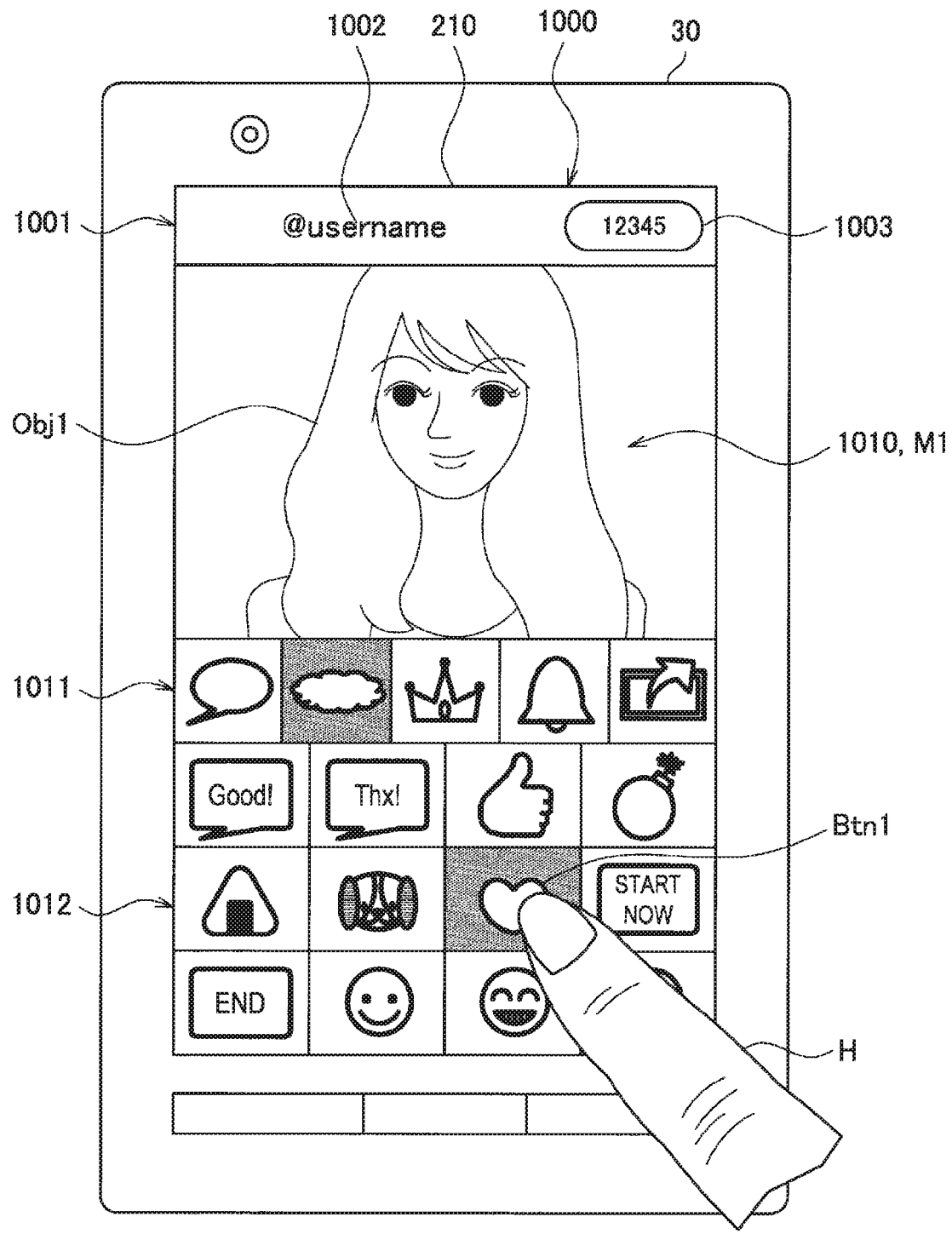
FIG. 3 is a diagram for describing a manipulation of selecting a sticker using the UI displayed on the display manipulation unit of the user terminal.

FIG. 2 is a diagram showing an example of a configuration of a UI displayed on a display manipulation unit 210 of the user terminal 30 (20). Referring to FIG. 2, the display screen 1000 is displayed on the display manipulation unit 210 of the user terminal 30 (20). In the display screen 1000, a header 1001, the live video display screen 1010, a mode selection screen 1011, and the sticker selection screen 1012 are displayed.

The header 1001 includes an ID 1002 and live-video-related information 1003. In the ID 1002, an ID of a viewing user may be displayed, or an ID of a distribution user representing a distribution source of live video may be displayed. The live-video-related information 1003 may be, for example, an index (for example, a "user level") representing a frequency in which the distribution user or a viewing user utilizes the information processing system 1, or may be an index (for example, a "livening-up point") related to live video. The index related to live video may be, for example, a value (equivalent to the livening-up point) calculated in accordance with the number of execution or the like of processing (for example, location of a sticker) having been performed on live video by a viewing user or the like during distribution of the live video. By causing the index related to live video or an index related to each user to be displayed to each user, it is possible to promote utilization of the information processing system 1 by each user. For example, since the level of attention to a user himself/herself can be increased such as by being positioned at a higher place in ranking including many users by increasing the above-described index, it is possible to further promote utilization of the information processing system 1 by the user. Therefore, it is desirable to cause the above-described index to be displayed in the live-video-related information 1003 of the header 1001. In addition, by making it easier to increase the above-described index in a case where the user uses a specific sticker, it is possible to promote utilization of the information processing system 1 by the user more.

The live video display screen 1010 is a screen for causing live video M1 distributed from the server 10 to be displayed. In the example shown in FIG. 2, a distribution user object Obj1 corresponding to a distribution user is included in the live video M1. In the information processing system 1 according to the present embodiment, live video captured by the user terminal 20 of the distribution user is distributed to the user terminal 30 of each viewing user through the server 10.

The mode selection screen 1011 is a screen for a user to select a manipulation mode on live video. For example, the mode selection screen 1011 includes objects for causing a comment writing mode, a user ranking display mode, a notification checking mode, a sharing mode, or the like to be selected, in addition to a sticker selection mode. In the example shown in FIG. 2, the sticker selection mode has been highlighted. This indicates that the sticker selection mode has been selected.

The sticker selection screen 1012 is a screen for a user to select any sticker in a case where the sticker selection mode has been selected. The sticker selection screen 1012 includes at least one sticker. When the user manipulates the live video display screen 1010 in a state where at least one sticker has been selected, an instruction for carrying out processing concerning the sticker on the live video M1 is transmitted to the server 10. This manipulation processing will be described later.

Note that, in a case where a mode different from the sticker selection mode has been selected by a user manipulation on the mode selection screen 1011, a manipulation screen corresponding to each mode having been selected is displayed on the sticker selection screen 1012. For example, in a case where the comment writing mode has been selected, a screen for writing a comment (for example, a text field, a virtual keyboard, or the like) is displayed on the sticker selection screen 1012. In addition, in a case where the user ranking display mode has been selected, information concerning ranking of users is displayed on the sticker selection screen 1012.

Subsequently, an example of manipulation processing through use of a UI displayed on the display manipulation unit 210 of the user terminal 30 (20) will be described. FIG. 3 is a diagram for describing a manipulation of selecting a sticker using the UI displayed on the display manipulation unit 210 of the user terminal 30 (20). Referring to FIG. 3, it is assumed that a user who manipulates the user terminal 30 has selected a button Btn1 representing a heart-shaped sticker included in the sticker selection screen 1012 with the manipulating body H (for example, a user's finger). At this time, highlighting processing may be performed on a region defining the button Btn1 in order to display that the button Btn1 has been selected.

Figure 4:
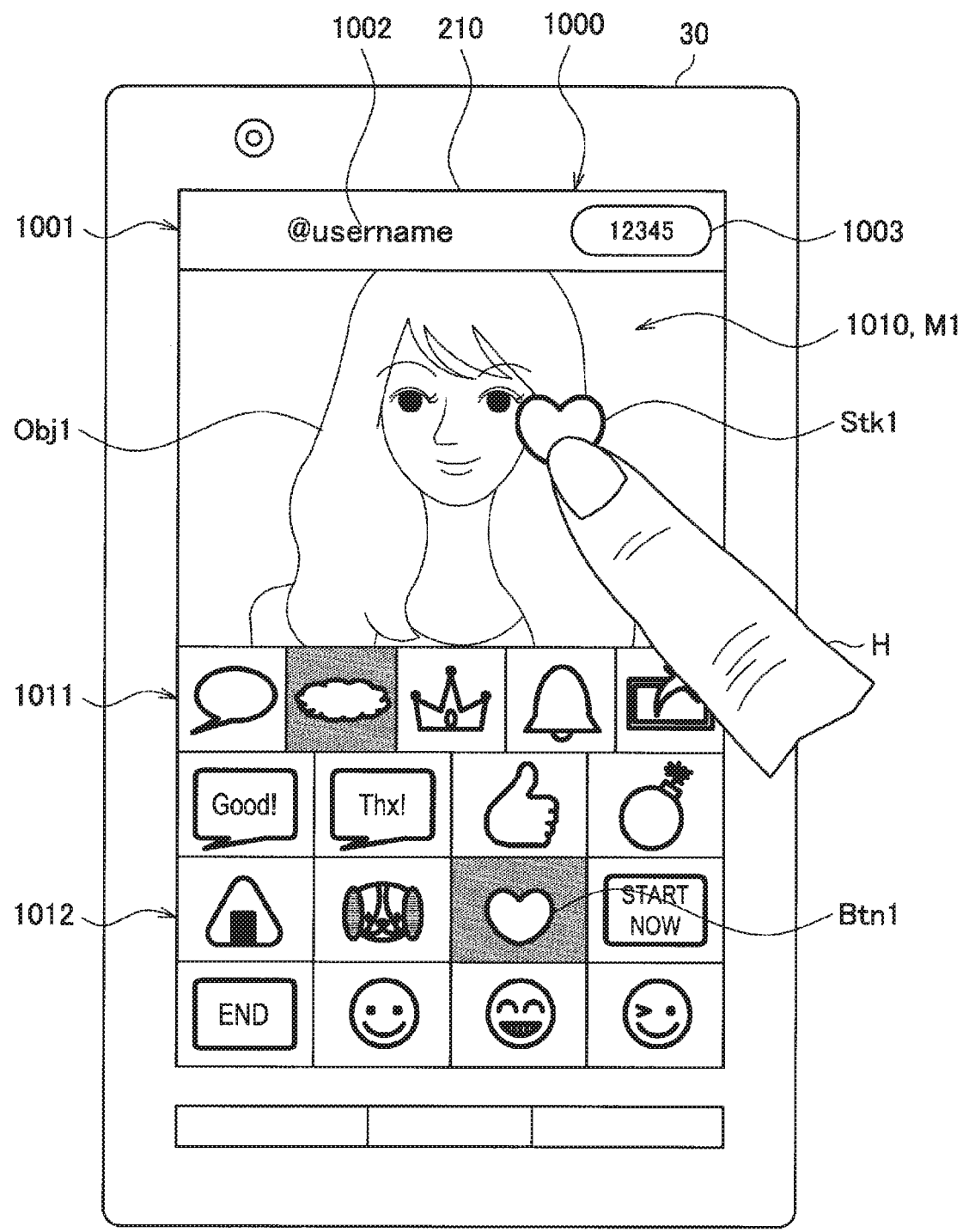
FIG. 4 is a diagram for describing a manipulation of locating a sticker on live video using the UI displayed on the display manipulation unit of the user terminal.

FIG. 4 is a diagram for describing a manipulation of locating a sticker on live video using the UI displayed on the display manipulation unit 210 of the user terminal 30 (20). Referring to FIG. 4, after the button Btn1 is selected, the user selects any position (location position) on the live video display screen 1010 with the manipulating body H. At this time, the user terminal 30 transmits manipulation information (for example, the type, location position, or the like of a sticker Stk1) with the manipulating body H to the server 10. The server 10 having acquired the manipulation information performs image processing based on the manipulation information on live video. Then, the server 10 distributes the live video after the image processing to a plurality of user terminals including the user terminal 30. Accordingly, the live video M1 (for example, live video on which the sticker Stk1 has been superimposed) after the image processing is displayed on the live video display screen 1010.

An example of the configuration and manipulation processing of the UI displayed on the display manipulation unit of the user terminal 30 (20) has been described above. In this manner, a distribution user and a viewing user can easily make communication with live video being distributed using a sticker or the like. Accordingly, it is possible to make communication between users smoother without compromising real-time performance of live video. Each device included in the information processing system 1 as described above will be described below in detail.

<<2. Configuration of Each Device>>
<2.1. Server>

Figure 5:
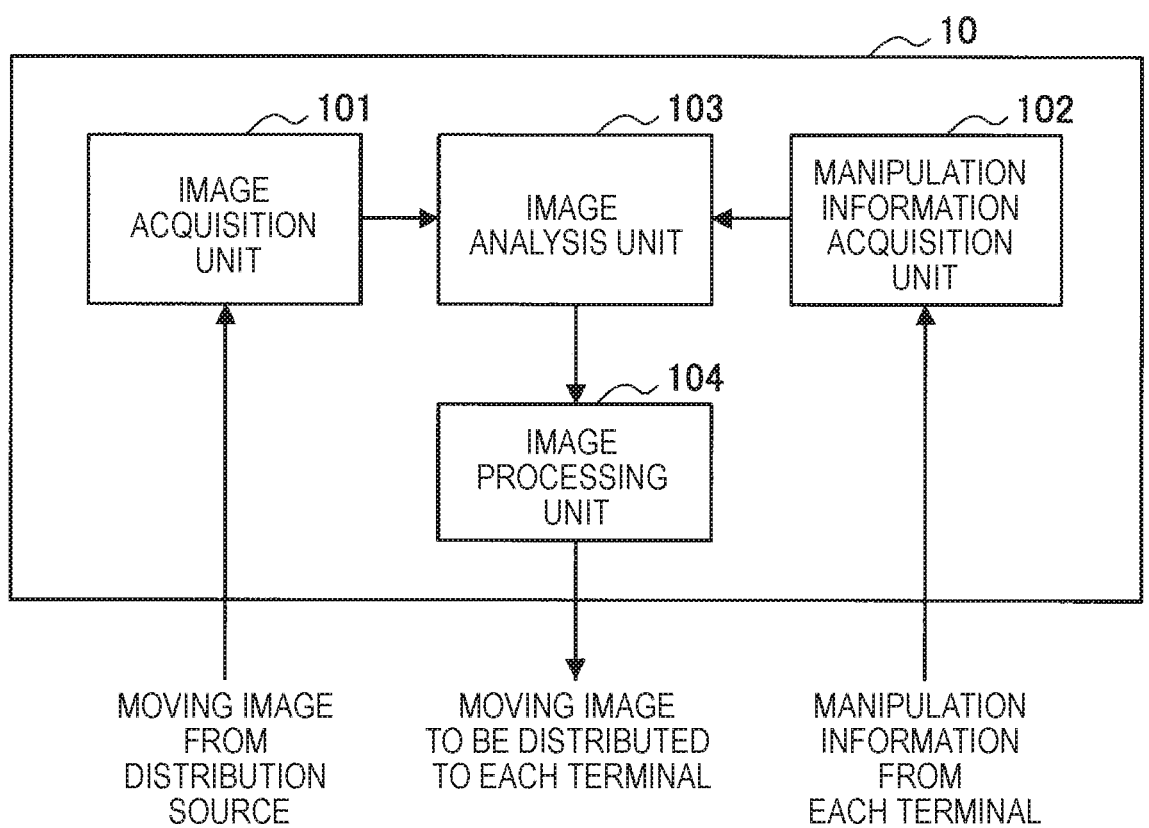
FIG. 5 is a block diagram showing a functional configuration example of a server according to the embodiment.

FIG. 5 is a block diagram showing a functional configuration example of the server 10 according to an embodiment of the present disclosure. Referring to FIG. 5, the server 10 includes an image acquisition unit 101, a manipulation information acquisition unit 102, an image analysis unit 103, and an image processing unit 104. The operations of these respective functional units are controlled by a processing circuit such as a central processing unit (CPU) included in the server 10.

(Image Acquisition Unit)

The image acquisition unit 101 acquires moving image data generated by the user terminal 20 which is a distribution source of live video through a communication unit not shown. For example, the image acquisition unit 101 acquires moving image data generated by the user terminal 20 in time series. For example, information such as acoustic information and a capturing time of a moving image are included in the moving image data, in addition to the moving image which is live video.

The image acquisition unit 101 outputs the acquired moving image data sequentially to the image analysis unit 103. Note that the frame rate of moving image data sequentially output to the image analysis unit 103 may be determined in accordance with at least either an imaging frame rate by an imaging unit 220 of the user terminal 20 or a throughput of analytical processing performed by the image analysis unit 103 or image processing performed by the image processing unit 104 which will be described later. For example, the frame rate may be determined in accordance with a processing time whose throughput is longer between the above-described analytical processing and image processing. Accordingly, latency that may occur between user terminals on the distribution side and on the viewing side of a moving image having been subjected to image processing.

Note that, in a case where analytical processing on a moving image by the image analysis unit 103 is not carried out, the image acquisition unit 101 may output moving image data to the image processing unit 104.

(Manipulation Information Acquisition Unit)

The manipulation information acquisition unit 102 acquires manipulation information transmitted from at least either the user terminal 20 or the user terminal 30 through the communication unit not shown. For example, the manipulation information acquisition unit 102 acquires manipulation information transmitted from at least either of the user terminals in time series. The manipulation information includes, for example, a manipulation position concerning location of a sticker on a moving image being displayed on the display manipulation unit 210 of the user terminal 20, information concerning the sticker, as well as the type of a manipulation performed on the display screen on which the moving image is being displayed and a manipulation mode, and the like.

Here, the manipulation position means a position on a moving image designated on the moving image with a manipulation body or the like. More specifically, the manipulation position may be a position on a moving image corresponding to a position with which the manipulation body has made contact in a case where the manipulation body makes contact with the display manipulation unit 210. This manipulation position may be specified by a pixel position of a moving image. In detail, the manipulation information acquisition unit 102 acquires a position (u,v) on the moving image corresponding to a position (x,y) on the display manipulation unit 210 of the user terminal 20, as the manipulation position. This position (u,v) on the moving image corresponds to a pixel position of the moving image.

Information concerning a sticker also includes, for example, the type of the sticker, the mode of the sticker, and information concerning image processing on a moving image, such as an effect that the sticker located on the moving image has. In addition, the effect includes, for example, an effect of changing the type or mode of the sticker itself, an effect of changing the type or mode of another sticker located on the moving image, and the like. The effect of changing the mode of the sticker may be an effect of changing the size, color, position, inclination, motion, display time, or the like of the sticker. In addition, the effect also includes an effect of performing processing or edit processing on a moving image or an effect of outputting a sound, such as a sound effect.

The type of a manipulation includes, for example, use or non-use of a sticker superimposed on a display screen of a moving image as described above. In addition, the manipulation mode includes, for example, a manipulation method with the manipulation body on the display screen of the moving image. More specifically, the manipulation mode includes publicly-known gesture processing on a touch panel or the like having a function as the display manipulation unit, such as a tap manipulation, a pinch manipulation, a swipe manipulation, or a sliding manipulation with the manipulation body. Further, in a case where the display manipulation unit is capable of detecting a pressure applied by the manipulation body, the manipulation mode also includes information concerning the magnitude of a pressure applied to the display manipulation unit. The manipulation position, the information concerning a sticker, the type of a manipulation, and the manipulation mode are transmitted from the user terminal 20 (30) to the server 10 as manipulation information, and are acquired by the manipulation information acquisition unit 102.

The manipulation information acquisition unit 102 outputs the acquired manipulation information to the image analysis unit 103. Note that, in a case where analytical processing on a moving image by the image analysis unit 103 is not carried out, the manipulation information acquisition unit 102 may output the manipulation information to the image processing unit 104.

(Image Analysis Unit)

The image analysis unit 103 performs an image analysis on the basis of moving image data acquired by the image acquisition unit 101 and manipulation information acquired by the manipulation information acquisition unit 102. More specifically, the image analysis unit 103 analyzes a region corresponding to the manipulation position on a moving image.

For example, the image analysis unit 103 performs an analysis for a region on a moving image corresponding to the manipulation position concerning location of a sticker included in a piece of manipulation information. Specifically, the image analysis unit 103 recognizes a specific object from a region on the moving image corresponding to the manipulation position. This object may be an object such as a human or an object included in the moving image, for example. The moving image generally includes a background and an object. In a case of performing image processing on the moving image in the image processing unit 104 in a later stage, and in a case where an effect of the image processing is exerted even to the background of the moving image, a strange feeling on the moving image may be created in the viewing user. Therefore, when the image analysis unit 103 analyzes an object to be targeted for image processing, the effect of the image processing is exerted only to the object, so that it is possible to prevent a strange feeling from being created in the viewing user. In addition, when the image analysis unit 103 analyzes an object, image processing in accordance with the object can also be performed by the image processing unit 104 in a later stage.

Note that the object analyzed by the image analysis unit 103 may be a living body such as a human, an object, or the like. The image analysis unit 103 may recognize a specific object using a publicly-known image recognition technology, an image analysis technology, or the like, such as feature amount calculation. In addition, in a case where an object included in a moving image changes in time series, the image analysis unit 103 may analyze the motion of the object.

Note that the targets to be analyzed by the image analysis unit 103 are the whole and part of a moving image before processing by the image processing unit 104 and the whole and part of the moving image after processing by the image processing unit 104. The moving image after processing means a moving image after being processed by the image processing unit 104. That is, a sticker or the like superimposed on the moving image is also targeted for an analysis performed by the image analysis unit 103. Whether the target to be analyzed is a moving image before processing or a moving image after processing may be determined in accordance with the type or target of processing performed by the image processing unit 104.

The image analysis unit 103 outputs an analysis result to the image processing unit 104.

(Image Processing Unit)

The image processing unit 104 performs image processing on a moving image on the basis of the analysis result acquired from the image analysis unit 103 and manipulation information acquired by the manipulation information acquisition unit 102. The image processing as mentioned here is, for example, sticker locating processing. Further, the image processing performed by the image processing unit 104 may include processing or edit processing on a moving image.

For example, in the sticker locating processing, the image processing unit 104 performs processing of superimposing a sticker on the manipulation position on a moving image on the basis of a tap manipulation on the moving image with the manipulation body. In a case where the sticker is superimposed on the moving image, the superimposed sticker may be bound in the same layer as the moving image, or may be superimposed on a layer different from that of the moving image. Note that the image processing unit 104 may further perform processing on a sticker superimposed earlier on the moving image on the basis of manipulation information. For example, the image processing unit 104 may perform such image processing that, by overlaying another sticker on a sticker superimposed earlier on the moving image, still another effect is produced. In addition, the image processing unit 104 may change the type or mode of the sticker in accordance with the manipulation mode of the manipulation body. For example, in a case where a sliding manipulation is performed with the manipulation body, the image processing unit 104 may perform processing of sequentially changing the position of the sticker on the moving image on the basis of the sliding manipulation. In addition, in a case where a pinch manipulation is performed with the manipulation body, the image processing unit 104 may perform processing of enlarging or reducing the sticker on the basis of the pinch manipulation. Further, in a case where a pressure is applied to the display manipulation unit with the manipulation body, the image processing unit 104 may perform processing of changing the type or mode of the sticker in accordance with the value of the applied pressure. These types of processing may be performed in a case of newly superimposing a sticker on the moving image, or may be performed on a sticker already located on the moving image. For example, for a sticker already located on the moving image, the image processing unit 104 may perform processing of changing the type or mode of the sticker in accordance with the manipulation mode with the manipulation body. Note that the mode of the sticker means the size of the sticker, color, or the strength or type of an effect produced by location of the sticker.

These types of image processing are executed continuously during a predetermined time since the manipulation information acquisition unit 102 acquires manipulation information, for example. The predetermined time is determined in accordance with the type of manipulation information or the like. For example, for sticker locating processing, the image processing unit 104 performs processing of superimposing a sticker on a moving image for n seconds since manipulation information including an instruction to locate the sticker is acquired. Note that the image processing unit 104 may change the method of image processing in accordance with an execution time of image processing. For example, in a case where the image processing unit 104 performs sticker locating processing, for a sticker superimposed on the moving image, the image processing unit 104 may perform processing in which fade-out is gradually performed from over the moving image immediately before the time when image processing is terminated. Accordingly, it is possible to prevent a strange feeling about the moving image subjected to image processing from being created in a viewing user.

Specific examples of the above-described various types of image processing will be described later.

The image processing unit 104 performs image processing on an object recognized by the image analysis unit 103, for example. Accordingly, without creating a strange feeling in a user who views a moving image about the moving image as described above, it is possible to present an effect produced by the image processing to the user.

In addition, the image processing unit 104 may perform image processing in accordance with characteristics of an analyzed object. Characteristics of an object means characteristics included in one object. For example, in a case where an object is a human, characteristics of the object may be part of the human body. For example, part of the body is not only the face of the person, but also the head, face, eyes, nose, mouth, body trunk, limb (arm, leg), or the like.

Describing a specific example, in a case of performing image processing of superimposing a sticker on a moving image, the image processing unit 104 may change the mode of the sticker included in manipulation information in accordance with characteristics of an analyzed object. More specifically, a region corresponding to the manipulation position is included in a region in accordance with characteristics that the object has, the mode of the sticker may be changed. A change of the mode of the sticker may be, for example, a change of the type of the sticker included in manipulation information, or may be a change of the effect that the sticker included in manipulation information has. This allows the user to enjoy changes of stickers located at various positions on an object included in a moving image.

In addition, in a case where the motion of the object has been analyzed by the image analysis unit 103, the image processing unit 104 may perform image processing on the basis of the motion of the object. For example, the image processing unit 104 may perform processing of invalidating image processing executed earlier on the basis of the motion of the object. Accordingly, it is possible to invalidate such an action of a viewing user that may be disadvantageous to the distribution user. In addition, the image processing unit 104 may change the applied position of image processing executed earlier on the basis of the motion of the object. For example, the image processing unit 104 may change the location position of the sticker on the basis of the motion of the object. Accordingly, in a case where an object included in a moving image, for example, is the body of the distribution user, an effect as if the sticker has moved is produced on the moving image by a motion of the distribution user. This can make communication between the distribution user and the viewing user more diverse. Note that the above-described invalidation of image processing and a change of the applied position may be performed not only on the basis of the motion of the object, but also on the basis of manipulation information concerning a manipulation on the moving image by the distribution user. This allows the distribution user to easily execute invalidation of image processing or a change of the applied position.

In addition, the image processing unit 104 may perform not only image processing on the moving image displayed on the display manipulation unit 210 of the user terminal 20 (30), but also other processing based on manipulation information or the like. For example, the image processing unit 104 may perform processing based on an acquired amount of manipulation information. More specifically, the image processing unit 104 may perform processing based on a time-series distribution of the acquired amount of manipulation information. Other processing includes, for example, statistical processing or extraction processing on a moving image based on manipulation information or the like.

The image processing unit 104 may perform processing based on the time-series distribution of an acquired amount of manipulation information detected for a predetermined time. Here, the predetermined time may be a time between the start time and the end time of live video, for example. In this case, the image processing unit 104 may divide a moving image being distributed, for example, per unit time, and may perform processing on the basis of the acquired amount of manipulation information acquired by the manipulation information acquisition unit 102 in each divided segment.

For example, the image processing unit 104 may set a segment in which the acquired amount is large (for example, a segment in which the acquired amount is a threshold value or more) as an extraction segment. Then, the image processing unit 104 may bind a plurality of extraction segments. Accordingly, it is possible to easily generate highlight video concerning a moving image already distributed.

Note that extraction processing and highlight video generation processing performed by the image processing unit 104 as described above may be executed sequentially during distribution of a moving image by the user terminal 20 which is a distribution source, or may be executed as post processing after distribution of movie by the user terminal 20 is finished.

In addition, the predetermined time may be any segment specified during distribution of live video. In this case, the image processing unit 104 may perform processing based on manipulation information acquired in the segment.

For example, the image processing unit 104 may perform processing based on the distribution of manipulation positions. More specifically, the image processing unit 104 may perform statistical processing regarding a moving image on the basis of the distribution of manipulation positions acquired in a certain time segment. For example, the image processing unit 104 may acquire, by statistical processing, information such as which object among a plurality of objects included in the moving image has been subjected to manipulations most from the distribution of manipulation positions. The statistical processing may be, for example, counting processing such as polling or the like. This allows the distribution user to obtain more quantitative data regarding communication with viewing users.

Besides, the image processing unit 104 may perform processing based on acoustic information associated with a moving image, attribute information associated with manipulation information, or the like. Specific examples of these types of processing will be described later.

Moving image data including a moving image having been subjected to image processing by the image processing unit 104 is distributed to each user terminal through the communication unit not shown.

A functional configuration example of the server 10 has been described above.

<2.2. User Terminal>

Figure 6:
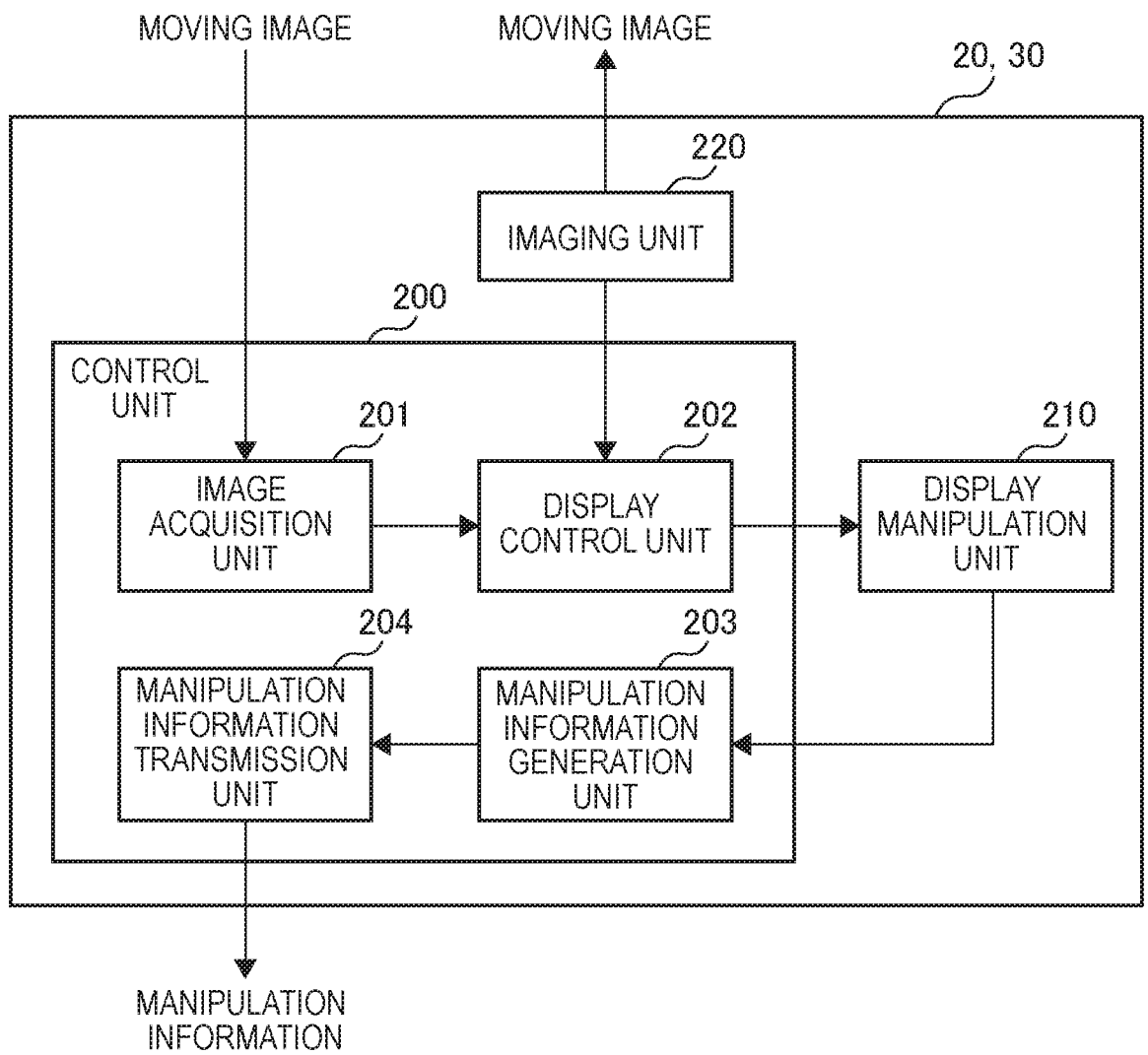
FIG. 6 is a block diagram showing a functional configuration example of a user terminal according to the embodiment.

FIG. 6 is a block diagram showing a functional configuration example of the user terminal 20 (30) according to an embodiment of the present disclosure. Note that since the user terminal 20 and the user terminal 30 have a similar functional configuration, the functional configuration of the user terminal 20 will be described here. Referring to FIG. 6, the user terminal 20 includes a control unit 200 and the display manipulation unit 210. Note that, in a case of performing processing of capturing a moving image by the user terminal 20, the user terminal 20 may further include the imaging unit 220.

(Control Unit)

The control unit 200 controls the overall operations of the respective functional units included in the user terminal 20. The control unit 200 is implemented by a processing circuit such as a CPU, for example. In addition, the control unit 200 has functions as an image acquisition unit 201, a display control unit 202, a manipulation information generation unit 203, and a manipulation information transmission unit 204.

(Image Acquisition Unit)

The image acquisition unit 201 acquires moving image data including a moving image from the server 10 through the communication unit not shown. The moving image acquired from the server 10 is a moving image once transmitted from a user terminal which is a distribution source of the moving image to the server 10. For example, the image acquisition unit 201 acquires moving image data in time series from the server 10. The image acquisition unit 201 outputs the acquired moving image data to the display control unit 202.

(Display Control Unit)

The display control unit 202 performs control for causing a moving image included in the moving image data acquired from the image acquisition unit 201 to be displayed on the display manipulation unit 210. For example, the display control unit 202 causes the moving image to be displayed on a predetermined screen within the display manipulation unit 210.

Note that, in a case where a moving image is distributed from the user terminal 20, the display control unit 202 may cause the moving image generated by the imaging unit 220 to be displayed on the display manipulation unit 210. However, in this case, since latency may occur between the moving image acquired from the server 10 and the moving image generated by the imaging unit 220, a misalignment may occur between a moving image viewed by the distribution user and a moving image viewed by a viewing user. Therefore, it is desirable that the moving image displayed on the display manipulation unit 210 is the moving image acquired from the server 10.

(Manipulation Information Generation Unit)

The manipulation information generation unit 203 generates manipulation information on the basis of a manipulation on the moving image displayed on the display manipulation unit 210. For example, the manipulation information generation unit 203 generates manipulation information on the basis of a manipulation concerning location of a sticker on the moving image displayed on the display manipulation unit 210. More specifically, the manipulation information generation unit 203 acquires a manipulation position concerning location of a sticker on the moving image, information concerning the sticker, the type of a manipulation on the display manipulation unit 210, and the manipulation mode from the display manipulation unit 210, and generates them as manipulation information. Note that the manipulation position included here in manipulation information means a manipulation position on the moving image. In detail, assuming that the manipulation body has made contact with the display manipulation unit 210 at a position (x, y) on the display manipulation unit 210, the manipulation information generation unit 203 acquires a position (u, v) on the moving image corresponding to the position (x, y) on the display manipulation unit 210 as the manipulation position. The manipulation information generation unit 203 outputs the generated manipulation information to the manipulation information transmission unit 204.

(Manipulation Information Transmission Unit)

The manipulation information transmission unit 204 transmits the manipulation information generated by the manipulation information generation unit 203 to the server 10 through the communication unit not shown.

Note that processing by the image acquisition unit 201 and processing by the display control unit 202 are sequentially executed, whilst processing by the manipulation information generation unit 203 and processing by the manipulation information transmission unit 204 are executed when there is a manipulation with the manipulation body on the display manipulation unit 210 on which a moving image is being displayed.

(Display Manipulation Unit)

The display manipulation unit 210 has functions as a display unit and a manipulation unit. The display manipulation unit 210 displays a moving image by the display control unit 202. In addition, the display manipulation unit 210 acquires a manipulation performed with the manipulation body. The information concerning the manipulation acquired by the display manipulation unit 210 is output to the manipulation information generation unit 203.

The display manipulation unit 210 may be implemented by a member that serves both as a display member and an input member, such as a touch panel, for example. In addition, in the present embodiment, the display manipulation unit 210 has functions as a display unit and a manipulation unit integrally, whilst the present technology is not limited to such an example. For example, the display manipulation unit 210 may have a function as a display unit and a function as a manipulation unit separately. In this case, the display unit may be implemented by, for example, a display device such as a liquid crystal display (LCD) or an organic electro-luminescence display (OELD). The display device that implements the display unit may have a touch sensor capable of recognizing publicly-known gesture processing on a touch panel or the like having the function as the display manipulation unit, such as a tap manipulation, a pinch manipulation, a swipe manipulation, or a sliding manipulation performed with the manipulation body. Accordingly, it is possible to detect a manipulation performed with the manipulation body making contact with the display unit. In addition, the display device that implements the display unit may further have a pressure-sensitive sensor. Accordingly, it is possible to detect a pressure applied to the display unit with the manipulation body. Consequently, the manipulation unit may be implemented by, for example, various input members such as a keyboard, a touch panel, a mouse, or a wheel. Note that, in a case where the display unit and the manipulation unit are provided separately in the user terminal 20, the manipulation position on a moving image being displayed on the display unit, the manipulation mode, or the like is specified by the manipulation unit.

(Imaging Unit)

The imaging unit 220 images real space, and generates a captured image (moving image). The generated moving image is transmitted to the server 10 through the communication unit not shown. In addition, the generated moving image may be output to the display control unit 202. The imaging unit 220 according to the present embodiment is implemented by, for example, an imaging device such as a charge coupled device (CCD) or a complementary metal oxide semiconductor (CMOS) and various members such as a lens for controlling image formation of a subject image on the imaging device. Note that the user terminal 20 according to the present embodiment may have the function of the imaging unit 220 provided outside the user terminal 20. In this case, the user terminal 20 may acquire a moving image generated by an imaging device such as a digital camera, and may transmit the moving image to the server 10.

A functional configuration example of the user terminal 20 (30) has been described above.

<<3. Operations in Information Processing System>>

Next, an operation example in each device of the information processing system will be described. Here, each operation example of manipulation processing performed by a user terminal and image processing performed by the server will be described.

<3.1. Operation in Manipulation Processing by User Terminal>

Figure 7:
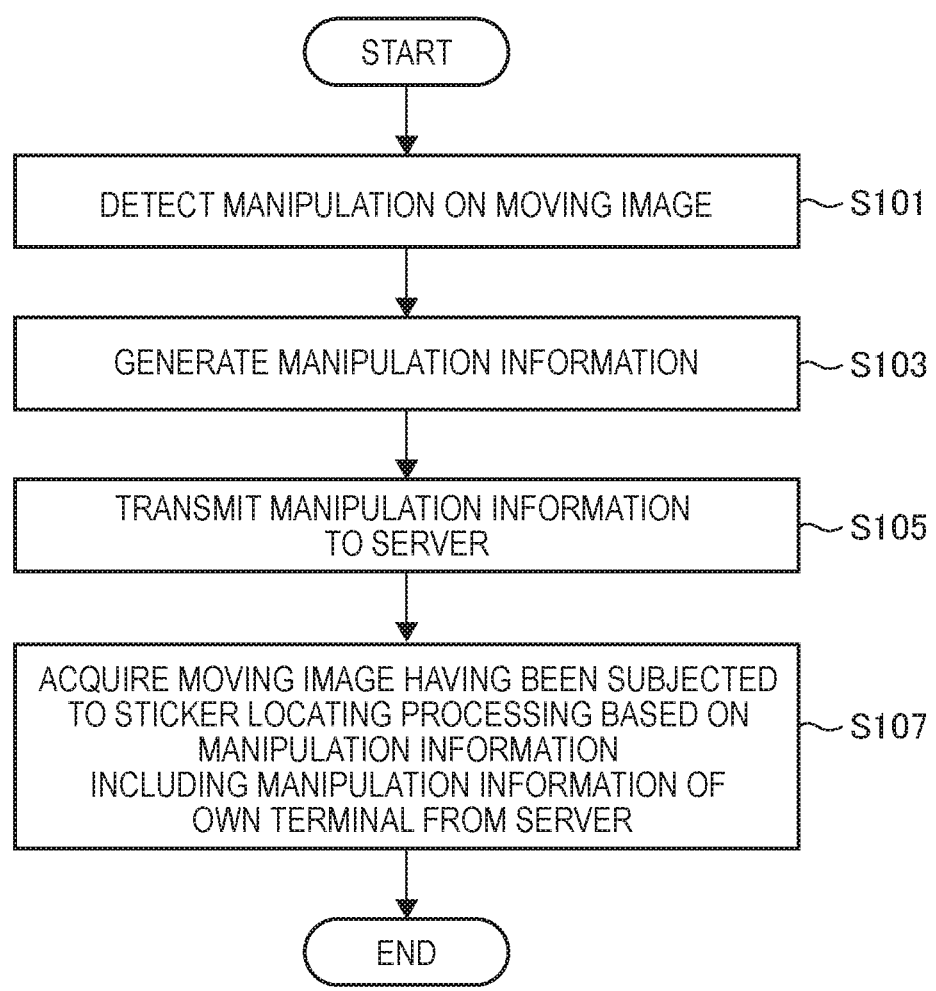
FIG. 7 is a flowchart showing an operation example of manipulation processing performed by the user terminal according to the embodiment.

FIG. 7 is a flowchart showing an operation example of manipulation processing performed by the user terminal 20 (30) according to an embodiment of the present disclosure. Here, a flow of processing in which the user terminal 20 generates manipulation information concerning a manipulation performed on the user terminal 20 with the manipulation body, and acquires a moving image having been subjected to image processing based on the manipulation information will be described.

Referring to FIG. 7, the display manipulation unit 210 first detects a manipulation performed on a moving image being displayed on the display manipulation unit 210 (S101). Subsequently, the manipulation information generation unit 203 acquires the manipulation detected by the display manipulation unit 210 from the display manipulation unit 210, and generates manipulation information on the basis of a manipulation concerning location of a sticker (S103). Next, the manipulation information transmission unit 204 transmits the manipulation information to the server 10 (S105). The server 10 having acquired the manipulation information performs image processing based on the manipulation information on a moving image being distributed.

Next, the image acquisition unit 201 acquires the moving image having been subjected to the image processing based on manipulation information at least including the manipulation information transmitted by the user terminal 20 from the server 10 (S107). Accordingly, manipulation processing carried out by the user terminal 20 is applied to the moving image being distributed.

<3.2. Operation in Image Processing by Server>

Figure 8:
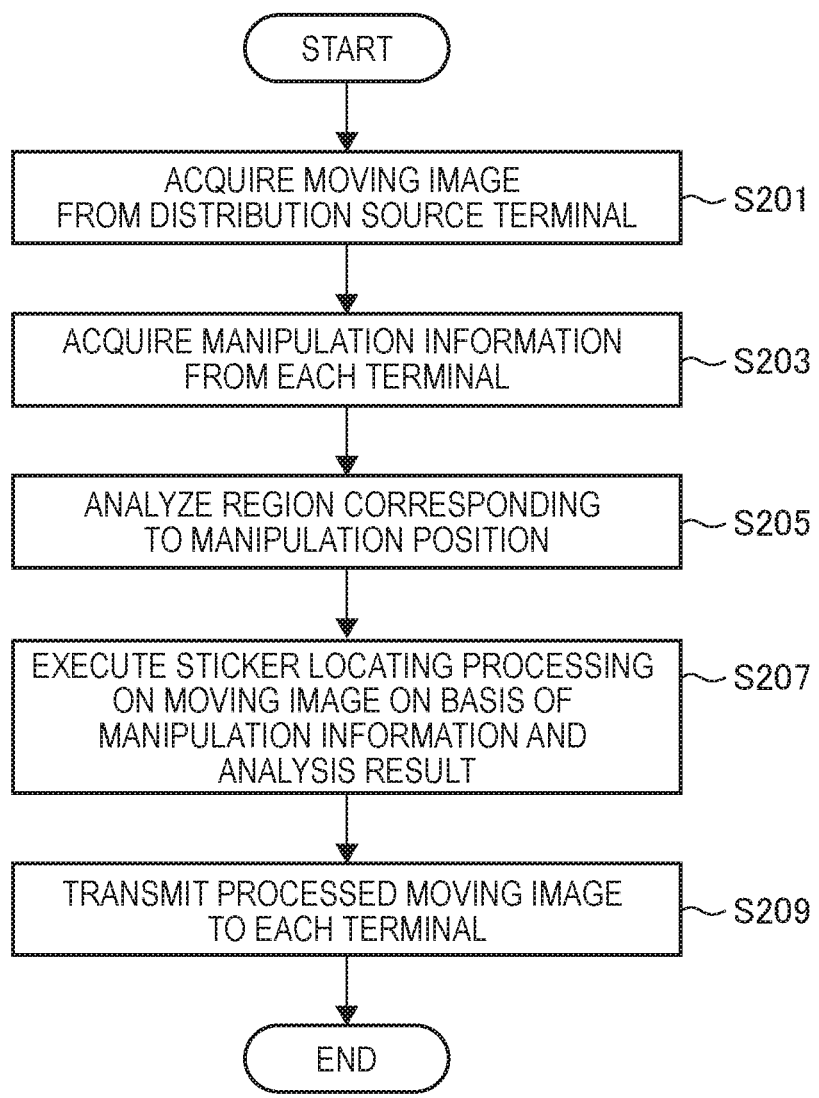
FIG. 8 is a flowchart showing an operation example of image processing performed by the server according to the embodiment.

FIG. 8 is a flowchart showing an operation example of image processing performed by the server 10 according to an embodiment of the present disclosure. Here, a flow of processing in which, from the user terminal 20 which is a distribution source of a moving image, the server 10 acquires the moving image, performs an image analysis and image processing on the basis of manipulation information, and distributes the moving image after the image processing will be described.

Referring to FIG. 8, the image acquisition unit 101 first acquires a moving image from the user terminal 20 which is a distribution source of the moving image (S201). In addition, the manipulation information acquisition unit 102 acquires manipulation information from a plurality of user terminals including the user terminal 20 which is a distribution source (S203).

Next, the image analysis unit 103 performs an image analysis for a region corresponding to the manipulation position included in the manipulation information (S205). Then, the image processing unit 104 executes sticker locating processing on the moving image on the basis of the manipulation information and an analysis result obtained by the image analysis unit 103 (S207). Then, the moving image having been subjected to the sticker locating processing by the image processing unit 104 is distributed to each user terminal (S209).

An operation example by the information processing system according to the present embodiment has been described above.

<<4. Image Processing Example by Information Processing System>>

Subsequently, an image processing example by the information processing system 1 according to the present embodiment will be described. The server 10 according to the present embodiment performs image processing on a moving image acquired from the user terminal 20 on the basis of manipulation information acquired from each user terminal. On that occasion, the server 10 may perform image processing after performing an image analysis on a region corresponding to the manipulation position included in the manipulation information. Accordingly, it is possible to perform processing through use of information such as an object included in the moving image. Consequently, it is possible to make communication between the distribution user and viewing users more diverse. Note that the server 10 according to the present embodiment is also capable of performing image processing without performing an image analysis. An image processing example will be described below.

<4.1. Deformation Processing>

First, moving image deformation processing performed by the information processing system 1 will be described. This deformation processing is to perform deformation processing on an object included in a moving image on the basis of manipulation information.

Figure 9:
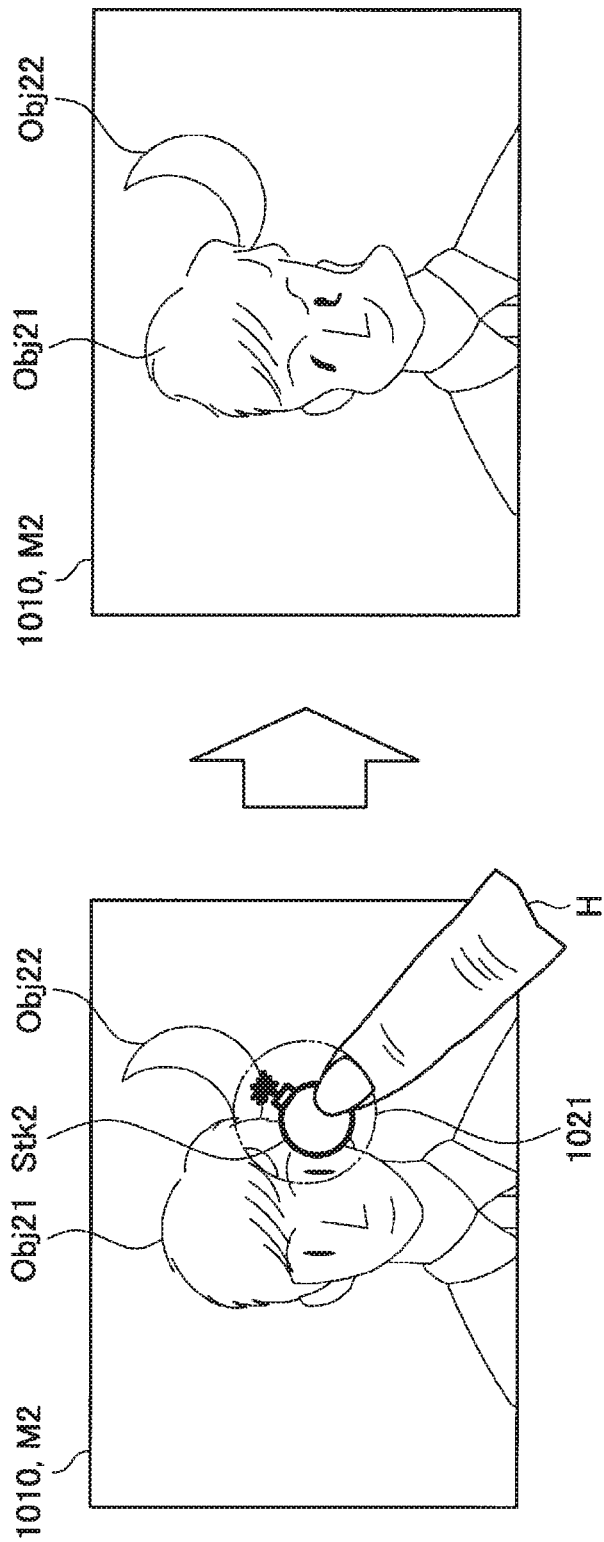
FIG. 9 is a diagram showing a first example of moving image deformation processing performed by the information processing system according to the embodiment.

FIG. 9 is a diagram showing a first example of moving image deformation processing performed by the information processing system 1 according to the present embodiment. Referring to FIG. 9, in the display manipulation unit 210 of the user terminal 30, live video M2 is being displayed on the live video display screen 1010. A moving body object Obj21 and a background object Obj22 are included in this live video M2. In the example shown in FIG. 9, the moving body object Obj21 is a human object, and the background object Obj22 is a moon object.

In the example shown in FIG. 9, it is assumed that a viewing user has located a sticker Stk2 representing a bomb on the live video M2 using the manipulating body H. This sticker Stk2 representing a bomb has characteristics of performing deformation processing on a moving image for a region corresponding to the location position. The manipulation information generation unit 203 generates manipulation information including the location position, type, and mode of the sticker Stk2, and the manipulation information transmission unit 204 transmits the manipulation information to the server 10.

When the manipulation information acquisition unit 102 acquires the above-described manipulation information, the image analysis unit 103 executes an image analysis for a region 1021 corresponding to the location position in the live video M2 acquired by the image acquisition unit 101, and recognizes objects included in the region. This region 1021 may be a predetermined region set for each piece of manipulation information. For example, in the example shown in FIG. 9, the region 1021 is a range where deformation processing on the live video M2 by the sticker Stk2 is exerted. In this case, the moving body object Obj21 and the background object Obj22 are included in the region 1021. Note that, in the image analysis unit 103, a publicly-known image analysis technology including optical flow estimation and the like is used.

The moving body object Obj21 is a human object, and is an object performing a large motion. On the other hand, the background object Obj22 is a moon object, and is an object performing a small motion or performing no motion. Here, in a case of performing deformation processing on a moving image irrespective of the type of objects included in the moving image, the entire region to be targeted for the deformation processing will be deformed. In this case, since the deformation processing will be exerted even to the background included in the moving image, for example, a strange feeling will be created in a user who views the moving image having been subjected to the deformation processing.

Thus, the image analysis unit 103 specifies an object performing a large motion as a target of image processing. For example, in the example shown in FIG. 9, the image analysis unit 103 specifies the moving body object Obj21 as an object targeted for image processing. The image processing unit 104 performs image processing only on the moving body object Obj21 on the basis of an analysis result obtained by the image analysis unit 103. For example, in the example shown in FIG. 9, the image processing unit 104 performs deformation processing only on the moving body object Obj21. Accordingly, as shown in FIG. 9, such live video in which only the face of the person is deformed and the moon in the background is not deformed can be obtained. Consequently, also in a case where a moving image is deformed or the like, it is possible to prevent the moving image from creating a strange feeling in the distribution user and viewing users.

Note that, in the example shown in FIG. 9, the deformation processing is performed by locating the sticker Stk2 representing a bomb on the live video M2, whilst the present technology is not limited to such an example. For example, by locating another sticker at any position on the moving image, image processing correlated to the sticker is executed for a region corresponding to the above-described position on the moving image.

In addition, in the example shown in FIG. 9, the deformation processing is performed on the moving body object Obj21 performing a large motion, whilst the present technology is not limited to such an example. For example, deformation processing or the like on the background object (for example, the background object Obj22 representing the moon) or the like may be performed. More specifically, the image analysis unit 103 may perform processing of changing the color (for example, processing such as darkening bright sky) on the background of the moving image. Accordingly, communication through a moving image can be made more enjoyable.

In addition, processing of deforming a moving image using a sticker is described in FIG. 9, whilst the present technology is not limited to such an example. For example, processing based on the manipulation mode on the display manipulation unit 210 with the manipulating body H can be performed without using a sticker.

Figure 10:
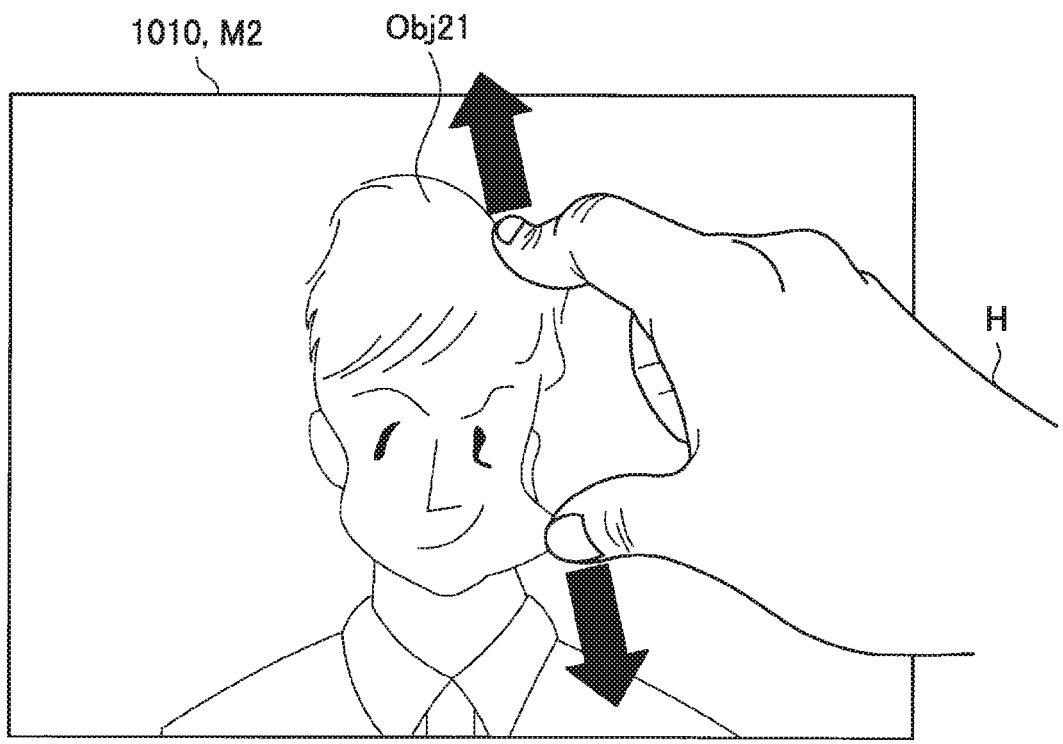
FIG. 10 is a diagram showing a second example of moving image deformation processing performed by the information processing system according to the embodiment.

FIG. 10 is a diagram showing a second example of moving image deformation processing performed by the information processing system 1 according to the present embodiment. Referring to FIG. 10, similarly to FIG. 9, in the display manipulation unit 210 of the user terminal 30, the live video M2 is displayed on the live video display screen 1010. At this time, it is assumed that a viewing user has executed a pinch-out manipulation with the manipulating body H. When manipulation information concerning the pinch-out manipulation is transmitted from the user terminal 30 to the server 10, the image analysis unit 103 performs an image analysis for a region corresponding to the manipulation position, and recognizes an object to be targeted for image processing. Then, the image processing unit 104 performs processing corresponding to the pinch-out manipulation on the object recognized by the image analysis. In the example shown in FIG. 10, deformation processing is performed on the object Obj2 in accordance with a direction corresponding to the pinch-out manipulation performed with the manipulating body H. In this manner, by executing a specific manipulation directly on the live video M2 without using a sticker, it is also possible to perform image processing on a moving image. Consequently, a viewing user can enjoy communication through a distributed moving image more easily.

<4.2. Image Processing in Accordance with Characteristics of Object>

Next, image processing in accordance with characteristics of an object included in a moving image performed by the information processing system 1 will be described. This image processing in accordance with characteristics of an object is, in accordance with characteristics of an object corresponding to the manipulation position, to vary image processing on the moving image.

Figure 11:
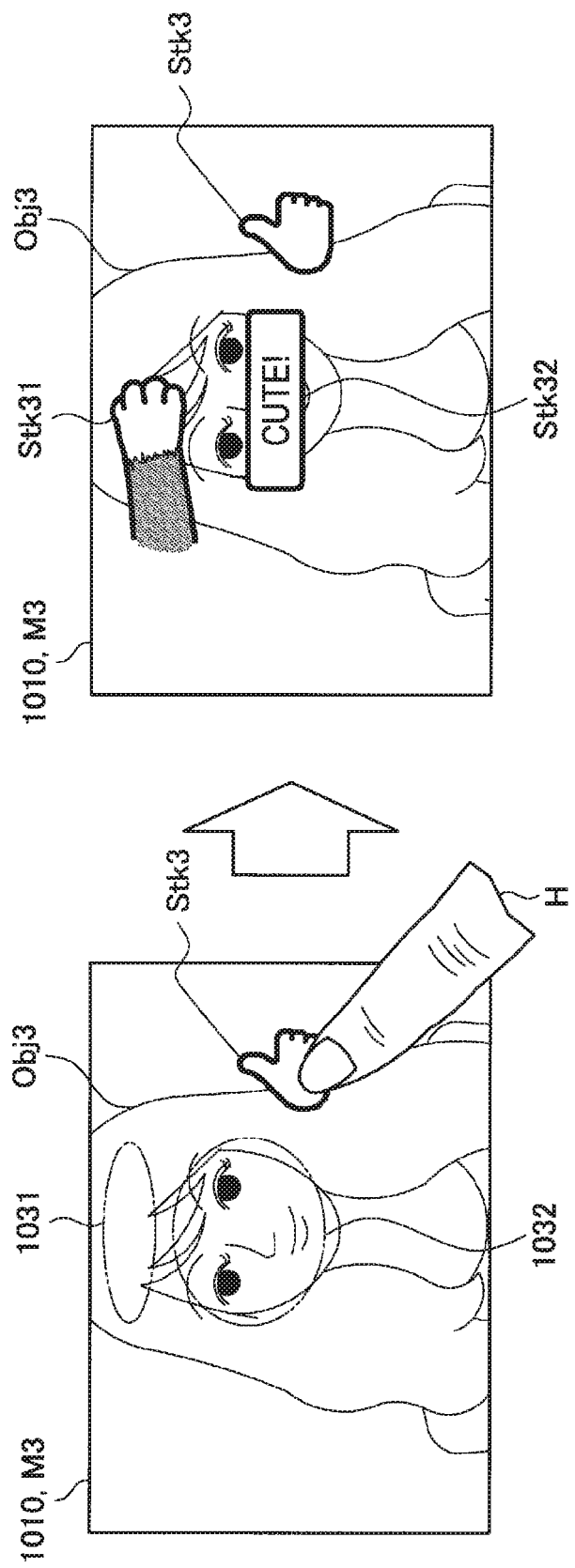
FIG. 11 is a diagram showing an example of image processing in accordance with characteristics of an object included in a moving image performed by the information processing system according to the embodiment.

FIG. 11 is a diagram showing an example of image processing in accordance with characteristics of an object included in a moving image performed by the information processing system 1 according to the present embodiment. Referring to FIG. 11, in the display manipulation unit 210 of the user terminal 30, live video M3 is displayed on the live video display screen 1010. A human object Obj3 is included in this live video M3. Further, in the example shown in FIG. 11, a region 1031 equivalent to the head of a person and a region 1032 equivalent to the face of the person are included in the human object Obj3.

In the example shown in FIG. 11, it is assumed that a viewing user has located a plurality of stickers Stk3 representing favors to the live video M3 on the live video M3 using the manipulating body H. This sticker Stk3 has characteristics of changing in its mode in a case where the location position is included in a specific region of an object. It is assumed that the stickers Stk3 have been located in the region 1031, the region 1032, and on the outside of these regions, respectively. The manipulation information generation unit 203 generates manipulation information including each location position, type, and mode of the stickers Stk3, and the manipulation information transmission unit 204 transmits the manipulation information to the server 10.

When the manipulation information acquisition unit 102 acquires the above-described manipulation information, the image analysis unit 103 executes an image analysis for a region (position) corresponding to the location position in the live video M3 acquired by the image acquisition unit 101, and recognizes objects included in the region. Further, the image analysis unit 103 may determine whether or not the region (position) corresponding to the location position is included in a region in accordance with characteristics that the object has. For example, in the example shown in FIG. 11, upon recognizing the human object Obj3, the image analysis unit 103 detects the region 1031 equivalent to the head of the person and the region 1032 equivalent to the face of the person, and determines whether or not the region (position) corresponding to the location position is included in these regions.

The image processing unit 104 performs image processing such as changing the mode of the sticker on the basis of an analysis result including the above-described determination result and the manipulation information and locating the sticker. For example, in the example shown in FIG. 11, in a case where the location position is included in the region 1031, the image processing unit 104 may change the sticker Stk3 representing a favor to a sticker Stk31 representing a cat paw, and may superimpose the sticker Stk31 on the live video M3. In addition, in a case where the location position is included in the region 1032, the image processing unit 104 may change the sticker Stk3 to a sticker Stk32 representing text of "CUTE!", and may superimpose the sticker Stk32 on the live video M3. Accordingly, it is possible to enjoy various displays from a single sticker in accordance with characteristics of an object included in a moving image.

<4.3. Gesture Processing>

Next, gesture processing with an object included in a moving image performed by the information processing system 1 will be described. This gesture processing is to change or cancel image processing performed on the moving image in accordance with a motion of the object.

FIG. 12 is a diagram showing an example of gesture processing with an object included in a moving image performed by the information processing system 1 according to the present embodiment. Referring to FIG. 12, in the display manipulation unit 210 of the user terminal 30, live video M4 is displayed on the live video display screen 1010. A human object Obj4 is included in this live video M4. Further, in the example shown in FIG. 12, a plurality of stickers Stk4 have been superimposed on the live video M4 so as to cover and hide the human object Obj4.

In the example shown in FIG. 12, it is assumed that the human object Obj4 has made such a gesture as to shake off the plurality of stickers Stk4 on the live video M4 using an arm. At this time, the image analysis unit 103 may recognize a motion of the arm of the human object Obj4. For example, the image analysis unit 103 recognizes the human object Obj4 on the live video M4 in advance, and then detects that the human object Obj4 has moved the arm along an arrow 1041.

When the image analysis unit 103 detects the motion of the arm, the image analysis unit 103 analyzes a sticker to be targeted for processing corresponding to the motion of the arm. In the example shown in FIG. 12, the plurality of stickers Stk4 have been superimposed on the live video M4 so as to cover and hide the human object Obj4. The image analysis unit 103 recognizes the plurality of stickers Stk4 existing in a region corresponding to the human object Obj4 as stickers to be targeted for processing corresponding to the motion of the arm on the human object Obj4. Then, the image analysis unit 103 outputs information that the recognized stickers Stk4 are targeted for processing corresponding to the motion of the arm to the image processing unit 104.

Next, the image processing unit 104 performs image processing in accordance with the motion of the arm on the live video M4. In the example shown in FIG. 12, the image processing unit 104 performs such processing as to move the plurality of stickers Stk4 recognized as processing targets by the image analysis unit 103 to positions not overlapping the human object Obj4. This allows a person imaged in the live video M4 as the human object Obj4 to resolve, by his/her own motion, a harassment to the distribution user with a sticker or the like, without directly manipulating the user terminal 20.

Note that, in the example shown in FIG. 12, the image processing unit 104 performs processing of moving the stickers Stk4 on the basis of the motion of the human object Obj4, whilst the present technology is not limited to such an example. For example, the image processing unit 104 may delete the stickers Stk4 on the basis of such a motion, or may change the stickers Stk4 to another mode. In addition, the gesture made by the human object Obj4 is not limited to the gesture of shaking off an arm. As long as the image analysis unit 103 can analyze the motion of the object, any gesture may be targeted for an image analysis.

In addition, in the example shown in FIG. 12, processing of moving the stickers Stk4 superimposed so as to cover and hide the human object Obj4 is shown, whilst the present technology is not limited to such an example. For example, also regarding deformation processing or the like applied to the human object Obj4, the image processing unit 104 can invalidate the deformation processing with a gesture of the human object Obj4. Accordingly, it is possible to cancel image processing that the distribution user does not intend.

In addition, processing of moving the stickers with a gesture is described in FIG. 12, whilst the present technology is not limited to such an example. For example, processing as described above may be performed on the basis of a manipulation on the user terminal 20.

Figure 13:
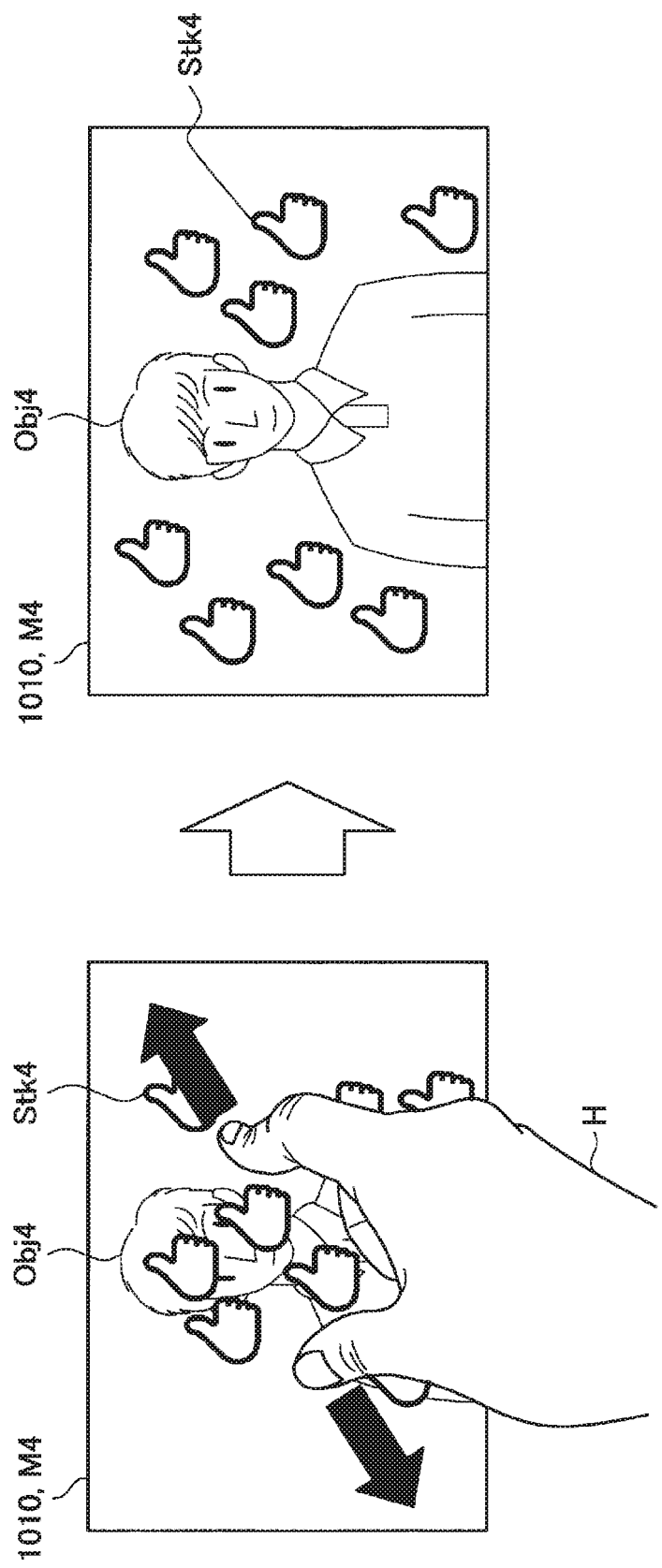
FIG. 13 is a diagram showing an example of sticker moving processing performed by the information processing system according to the embodiment.

FIG. 13 is a diagram showing an example of processing of moving a sticker performed by the information processing system 1 according to the present embodiment. Referring to FIG. 13, similarly to FIG. 12, in the display manipulation unit 210 of the user terminal 30, the live video M4 is displayed on the live video display screen 1010. The human object Obj4 is included in the live video M2, and the plurality of stickers Stk4 have been superimposed on the live video M4 so as to cover and hide the human object Obj4. At this time, it is assumed that the distribution user (or viewing user) has executed a pinch-out manipulation with the manipulating body H. When manipulation information concerning the pinch-out manipulation is transmitted from the user terminal 30 to the server 10, the image analysis unit 103 performs an image analysis for a region corresponding to the manipulation position, and specifies stickers superimposed on the human object Obj4. Then, the image processing unit 104 performs processing corresponding to the pinch-out manipulation on the stickers specified by the image analysis. In the example shown in FIG. 13, the plurality of stickers Stk4 superimposed on the human object Obj4 move in accordance with the direction corresponding to the pinch-out manipulation performed with the manipulating body H. In this manner, by executing a specific manipulation directly on the live video M4, it is also possible to perform processing of moving the stickers. This allows the distribution user to easily cancel a harassment to the distribution user.

<4.4. Processing Based on Manipulation on Sticker>

Next, processing based on a manipulation on a sticker performed by the information processing system 1 will be described. This processing based on a manipulation on a sticker is to change the mode of the sticker or the like on the basis of a manipulation performed on the sticker superimposed on a moving image with the manipulation body. Two examples of processing based on a manipulation of sliding a sticker and processing based on a tap manipulation on a sticker will be described below.

Figure 14:
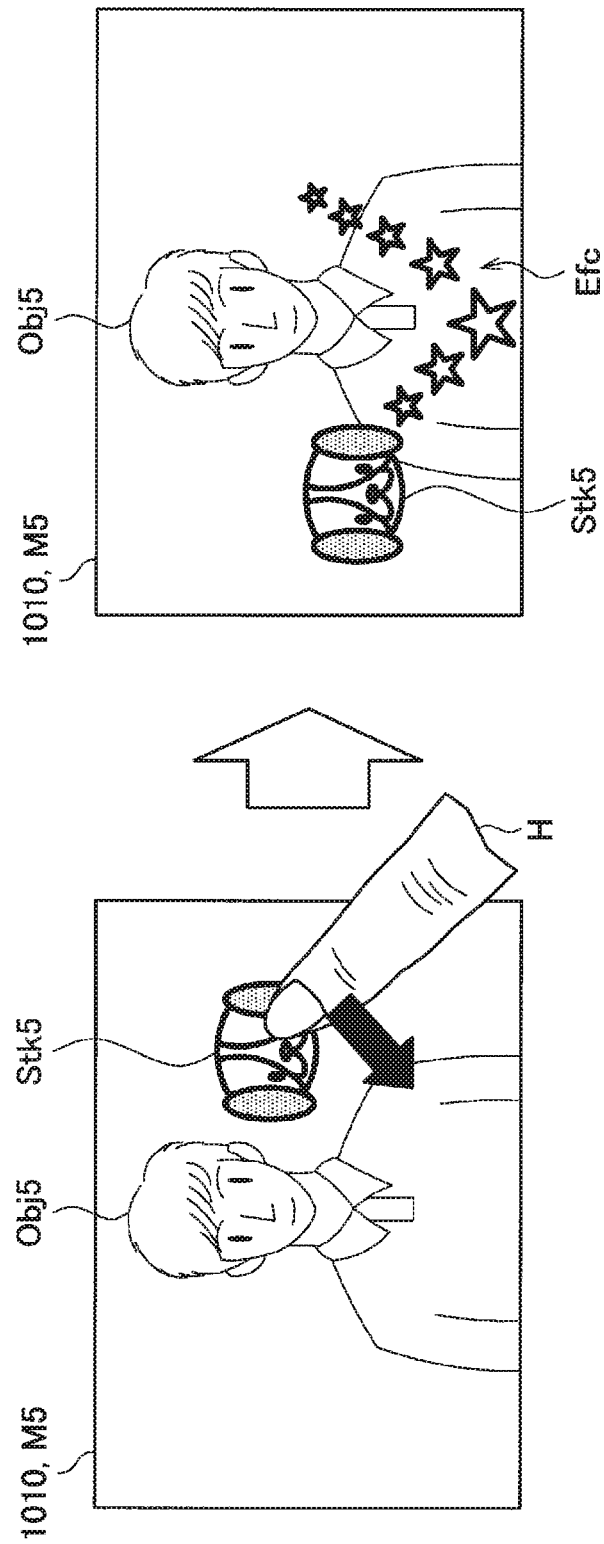
FIG. 14 is a diagram showing a first example of processing based on a sticker sliding manipulation performed by the information processing system according to the embodiment.

FIG. 14 is a diagram showing a first example of processing based on a manipulation of sliding a sticker performed by the information processing system 1 according to the present embodiment. Referring to FIG. 14, in the display manipulation unit 210 of the user terminal 30, live video M5 is displayed on the live video display screen 1010. A human object Obj5 is included in this live video M5.

In the example shown in FIG. 14, it is assumed that a user has located a sticker Stk5 on the live video display screen 1010 using the manipulating body H, and has made a sliding manipulation. The manipulation information generation unit 203 generates information concerning the location position of the sticker Stk5 and the sliding manipulation, and the manipulation information transmission unit 204 transmits the manipulation information to the server 10.

When the manipulation information acquisition unit 102 acquires the above-described manipulation information, the image processing unit 104 performs image processing based on the location position of the sticker Stk5, the sliding manipulation, and the like. For example, the image processing unit 104 may move the sticker Stk5 in a direction corresponding to the sliding manipulation of the manipulating body H at a predetermined speed using the location position of the sticker Stk5 as an initial position. Accordingly, the sticker Stk5 shows such a behavior as to slide over the live video M5. Note that the above-described predetermined speed may be determined in accordance with a sliding speed of the manipulating body H in the above-described sliding manipulation, for example.

In addition, as shown in FIG. 14, in a case of performing processing of sliding the sticker, the image processing unit 104 may perform predetermined processing on the entire moving image or an object when the sticker passes over the object included in the moving image. For example, in the example shown in FIG. 14, such processing that the image analysis unit 103 recognizes the human object Obj5, and the image processing unit 104 shows an effect Efc only on a region corresponding to the human object Obj5 may be performed. This allows a viewing user to not only view the live video, but also enjoy the live video like a game.

Figure 15:
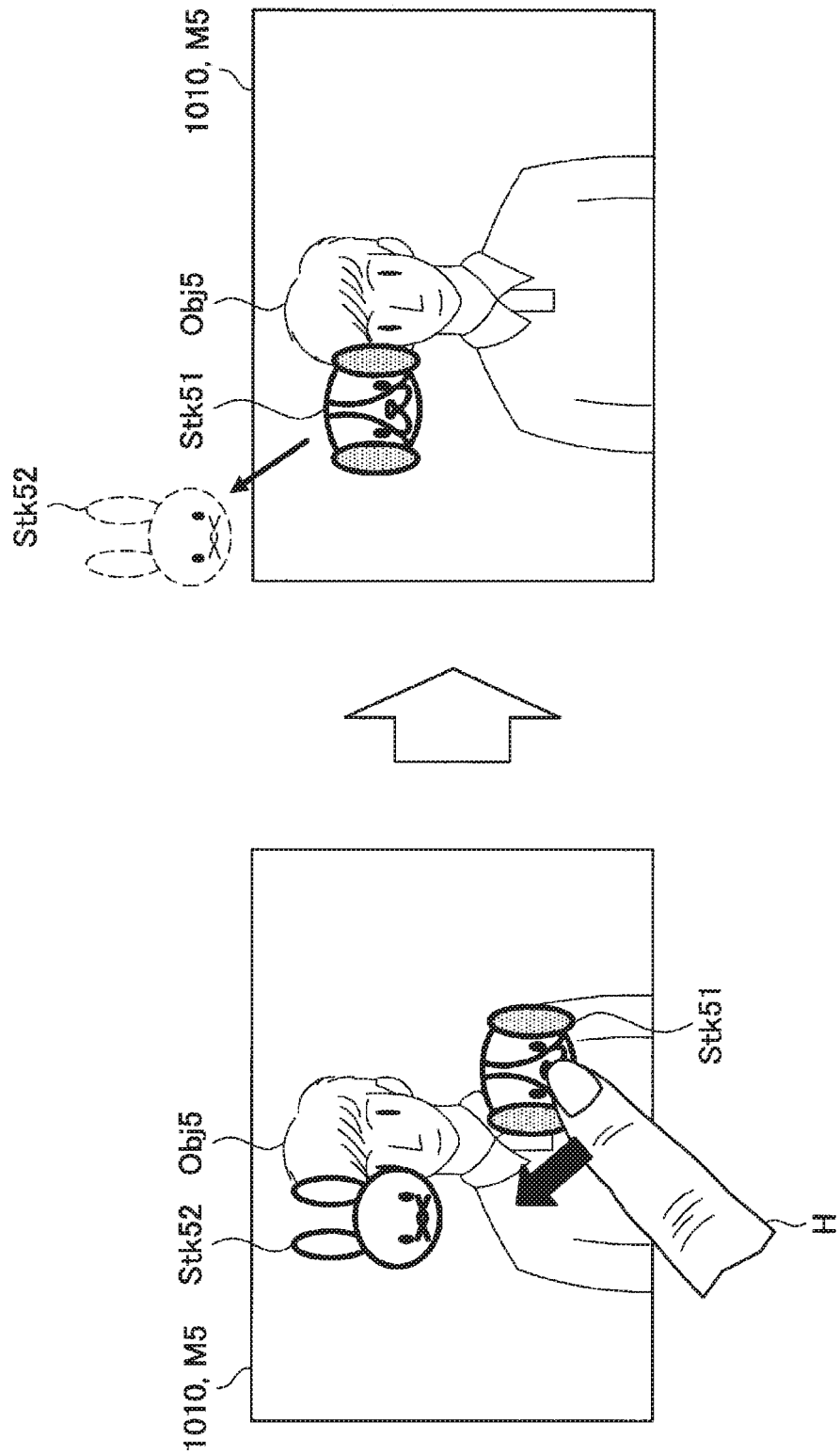
FIG. 15 is a diagram showing a second example of processing based on a sticker sliding manipulation performed by the information processing system according to the embodiment.

Further, in a case of performing processing of sliding the sticker, when the above-described sticker makes contact on a moving image with another sticker already superimposed on the moving image, the image processing unit 104 may perform predetermined processing on the moving image or each sticker. FIG. 15 is a diagram showing a second example of processing of sliding a sticker performed by the information processing system 1 according to the present embodiment. Referring to FIG. 15, in the display manipulation unit 210 of the user terminal 30, the live video M5 is displayed on the live video display screen 1010. The human object Obj5 and a second sticker Stk52 are included in this live video M5.

In the example shown in FIG. 15, it is assumed that a user has located a first sticker Stk51 on the live video display screen 1010 using the manipulating body H and has performed a sliding manipulation such that the first sticker Stk51 is slid toward the position at which the second sticker Stk52 is located. In this case, when it is determined that the first sticker Stk51 subjected to the sliding processing has made contact with the second sticker Stk52 on the live video M5, the image processing unit 104 may perform predetermined processing. For example, the image processing unit 104 may perform processing of displaying such a presentation that the second sticker Stk52 having been hit is flicked to the outside of the live video M5. In the example shown in FIG. 15, when the second sticker Stk52 is hit by the first sticker Stk51, the second sticker Stk52 is flicked to the outside of the live video display screen 1010. In this manner, when the image processing unit 104 performs predetermined processing when a plurality of stickers hit against each other through sliding processing, viewing users not only view the live video, but also can enjoy the live video like a game.

Note that the processing performed when a plurality of stickers hit against each other through sliding processing is not particularly limited. For example, the image processing unit 104 may perform such processing that, when a specific sticker hits another sticker, the specific sticker is changed to a still different sticker. In this manner, by changing processing to be performed when a hit occurs in accordance with the type of a sticker, it is possible to make viewing of live video by viewing users more diverse. Further, the mode related to a change in position of the sticker by sticker sliding over the live video is not particularly limited. For example, in accordance with the mode of sliding of the manipulating body H by sliding processing, the magnitude or direction of an amount of change in position of the sticker may be determined as appropriate.

Next, processing based on a tap manipulation on a sticker performed by the information processing system 1 will be described. This processing based on a tap manipulation on a sticker is, by performing a tap manipulation on a sticker superimposed on a moving image, to change the mode of the sticker, or the like.

FIG. 16 is a diagram showing an example of processing based on a tap manipulation on a sticker performed by the information processing system 1 according to the present embodiment. Referring to FIG. 16, in the display manipulation unit 210 of the user terminal 30, the live video M5 is displayed on the live video display screen 1010. The human object Obj5 and a third sticker Stk53 are included in this live video M5.

In the example shown in FIG. 16, it is assumed that a user has performed a predetermined tap manipulation using the manipulating body H on the third sticker Stk53 located earlier on the live video display screen 1010. This predetermined tap manipulation may be, for example, a tap manipulation performed by the manipulating body H a predetermined number of times or more within a predetermined time, a pressing manipulation performed by the manipulating body H applying a pressure of a predetermined pressure or more to the display manipulation unit 210, or the like. In this case, the manipulation information acquisition unit 102 may acquire manipulation information concerning the predetermined tap manipulation, and the image processing unit 104 may perform processing of changing the type or mode of the third sticker Stk53 in accordance with the manipulation information. In the example shown in FIG. 16, the third sticker Stk53 is changed to a fourth sticker Stk54 in accordance with the predetermined tap manipulation performed with the manipulating body H. In the example shown in FIG. 16, the fourth sticker Stk54 is a step obtained by enlarging the third sticker Stk53 by the predetermined tap manipulation performed with the manipulating body H. In this manner, when the sticker is changed in the type or mode in accordance with a tap manipulation, a plurality of users can make communication through one sticker.

Note that the above example has described that the image processing unit 104 changes the type or mode of a sticker on the basis of manipulation information concerning the predetermined tap manipulation, whilst the present technology is not limited to such an example. For example, the image processing unit 104 may change the type or mode of the sticker not only in accordance with a tap manipulation, but also in accordance with a predetermined sliding manipulation or a predetermined pinch manipulation on the sticker. For example, the image processing unit 104 may change the type or mode of the sticker in accordance with a manipulation of tapping the sticker located on a moving image and then sliding the sticker in a predetermined direction.

Besides, the image processing unit 104 may change the type or mode of the sticker in accordance with various manipulations on the sticker performed with the manipulating body H that the display manipulation unit 210 can acquire. Accordingly, communication including a gaming element can be formed through a sticker located on a moving image.

<4.5. Sticker Integrating Processing>

Next, processing of integrating stickers included in a moving image performed by the information processing system 1 will be described. This sticker integrating processing is to integrate stickers superimposed densely on a moving image.

Figure 17:
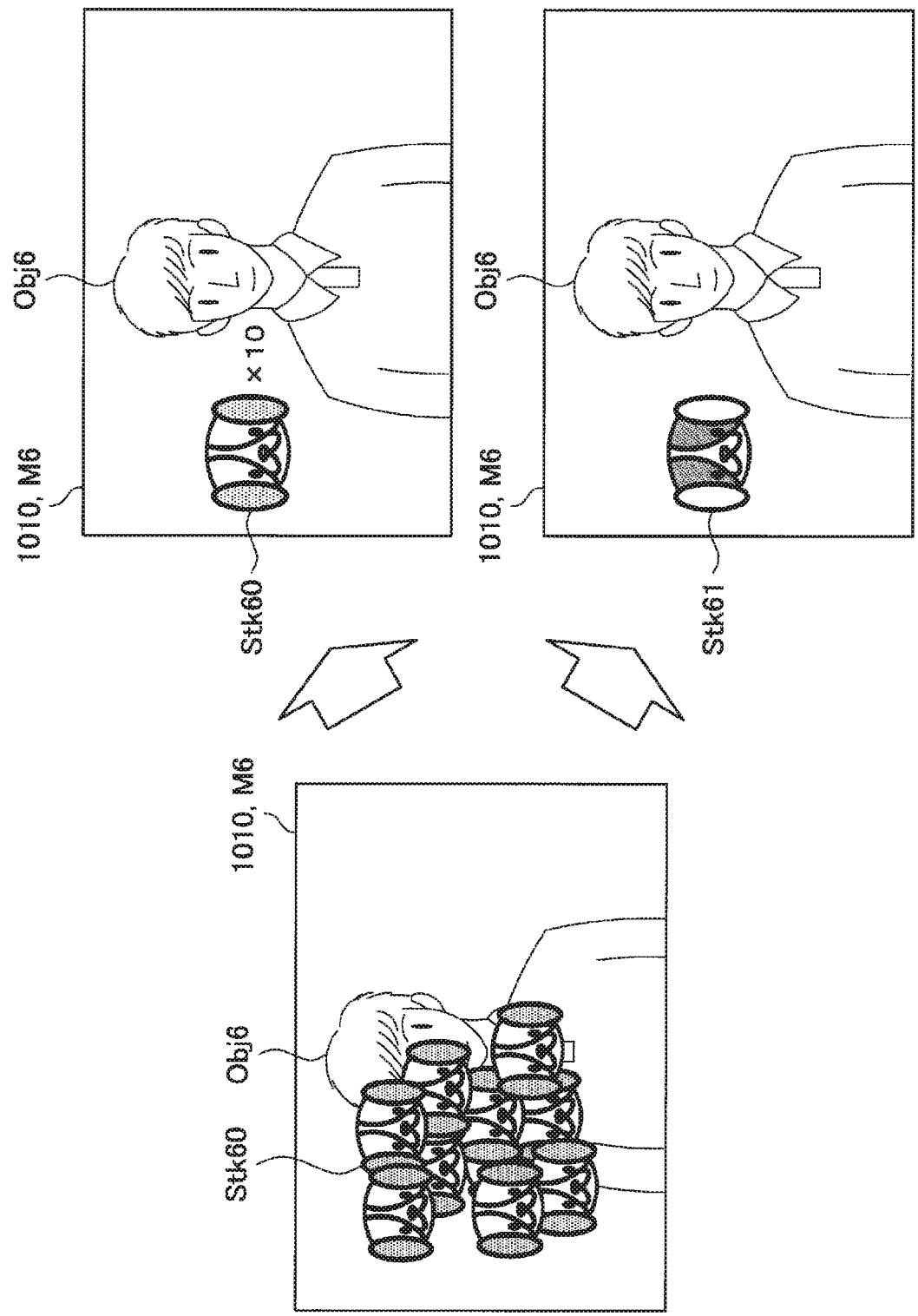
FIG. 17 is a diagram showing an example of processing of integrating stickers included in a moving image performed by the information processing system according to the embodiment.

FIG. 17 is a diagram showing an example of processing of integrating stickers included in a moving image performed by the information processing system 1 according to the present embodiment. Referring to FIG. 17, in the display manipulation unit 210 of the user terminal 30, live video M6 is displayed on the live video display screen 1010. A human object Obj6 is included in this live video M6. Further, in the example shown in FIG. 17, a plurality of stickers Stk60 have been superimposed on the live video M6 densely over the human object Obj6.

In the example shown in FIG. 17, in a case where the density of the stickers Stk60 exceeds a predetermined threshold value, the image processing unit 104 may perform processing of integrating these stickers Stk60. For example, as shown on the right upper side of FIG. 17, the image processing unit 104 may perform processing of integrating the plurality of stickers Stk60 into one sticker Stk60. On this occasion, the image processing unit 104 may display the number of the integrated stickers Stk60 in the vicinity of the sticker Stk60 like "x10". In addition, the image processing unit 104 may perform processing of displaying a sticker Stk61 different in mode from the sticker Stk60, instead of the sticker Stk60 after the integrating processing is performed. Accordingly, it is possible to ensure visibility of the human object Obj6 included in the live video M6 and to suggest to viewing users that the stickers have been integrated. Consequently, it is possible to ensure convenience of communication between the distribution user and viewing users through the moving image.

<4.6. Image Processing in Accordance with Acoustic Information>

Figure 18:
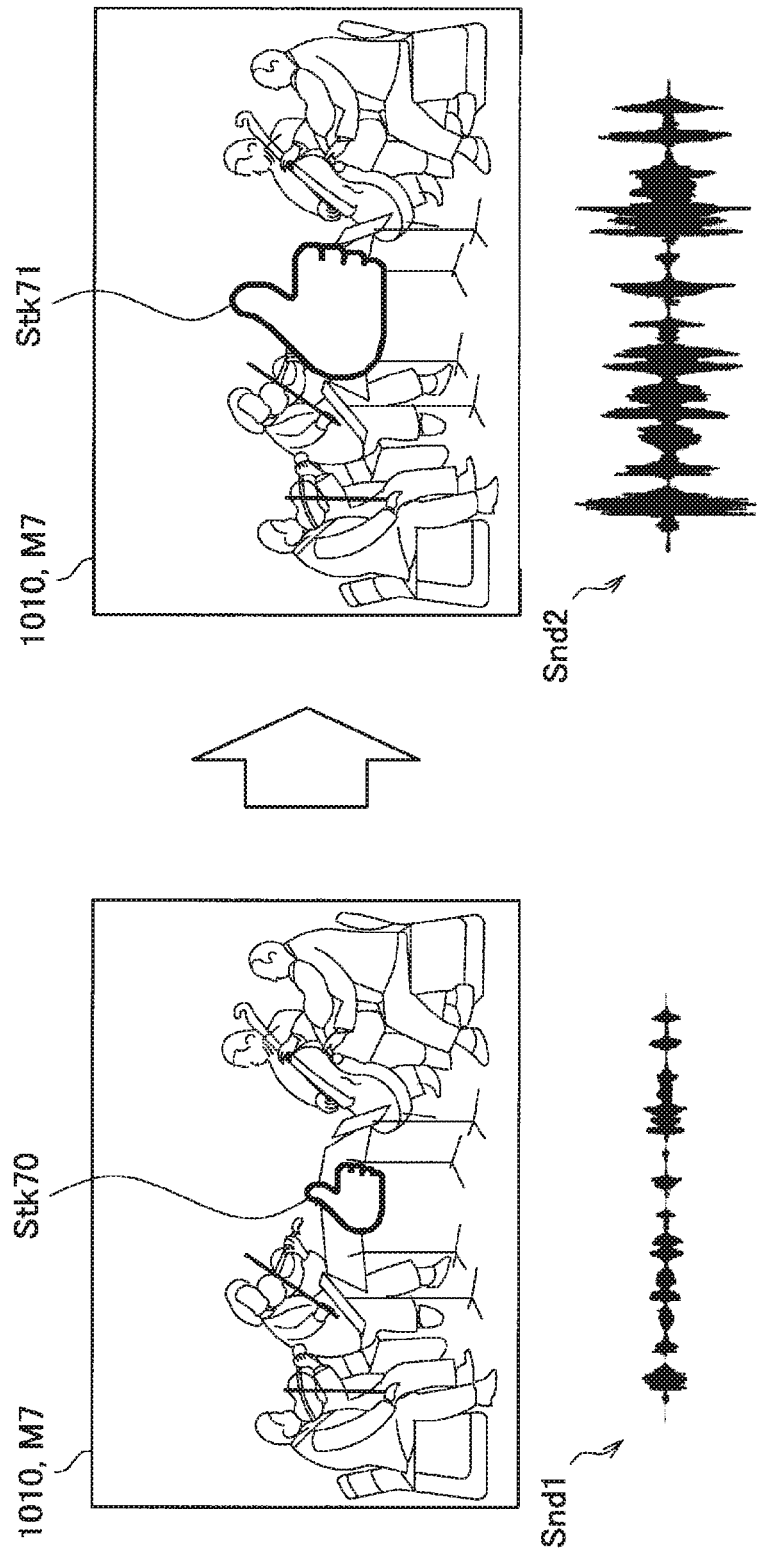
FIG. 18 is a diagram showing an example of image processing in accordance with acoustic information performed by the information processing system according to the embodiment.

Next, image processing in accordance with acoustic information performed by the information processing system 1 will be described. This image processing in accordance with sound is to execute, change, or cancel image processing in accordance with acoustic information associated with a moving image. FIG. 18 is a diagram showing an example of image processing in accordance with acoustic information performed by the information processing system 1 according to the present embodiment. Referring to FIG. 18, in the display manipulation unit 210 of the user terminal 30, live video M7 is displayed on the live video display screen 1010. A plurality of human objects playing music and a sticker Stk70 are included in this live video M7. In addition, the live video M7 is associated with acoustic information, and a sound wave Snd1 is included in the acoustic information. The amplitude of the sound wave Snd1 indicates the magnitude of sound volume.

The image processing unit 104 may perform image processing in accordance with acoustic information. In the example shown in FIG. 18, the image processing unit 104 may perform processing of changing the size of the sticker Stk70 in accordance with the magnitude of a sound wave. As shown on the right side in FIG. 18, since the amplitude of a sound wave Snd2 is larger than the amplitude of the sound wave Snd1, the image processing unit 104 performs processing of making the size of a sticker Stk71 larger than the sticker Stk70. Accordingly, the size of the sticker Stk70 is changed in accordance with the volume of sound of the live video M7. By performing image processing in accordance with sound in this manner, it is possible to increase realism of the live video given to viewing users.

Note that the image processing unit 104 may perform image processing not only in accordance with the sound volume, but also in accordance with a change in sound quality, sound field, or the like. Accordingly, it is possible to perform image processing that matches acoustic information.

<<5. Example of Application of Manipulation Information Performed by Information Processing System>>

An example of image processing performed by the information processing system 1 according to the present embodiment has been described above. The information processing system 1 according to the present embodiment not only performs image processing on a moving image on the basis of an image analysis result, but also may perform other processing based on manipulation information or the like. An example of application of manipulation information performed by the information processing system 1 according to the present embodiment will be described below.

<5.1. Highlight Movie Generation>

First, highlight movie generation processing performed by the information processing system 1 will be described. This highlight movie generation processing is to generate a highlight movie by extracting liven-up portions alone from a distributed moving image and binding the liven-up portions.

Figure 19:
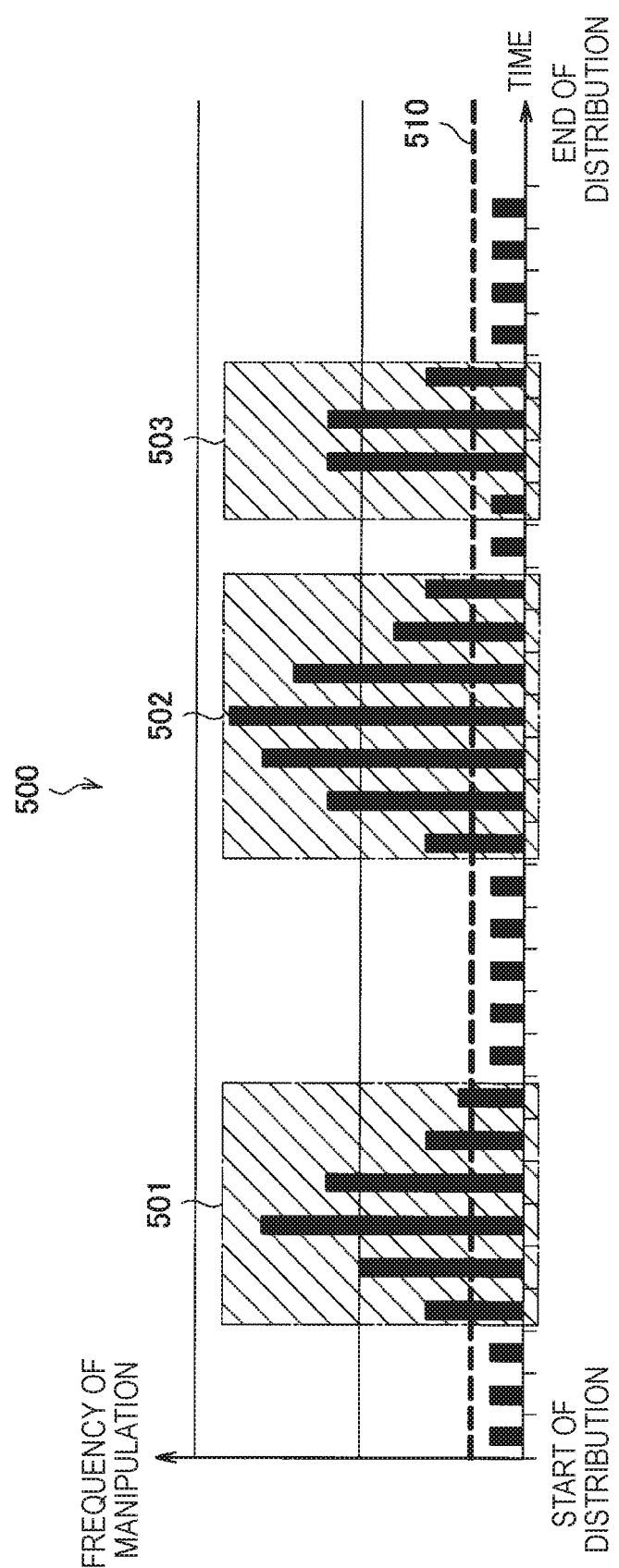
FIG. 19 is a diagram for describing an example of highlight movie generation processing performed by the information processing system according to the embodiment.

FIG. 19 is a diagram for describing an example of highlight movie generation processing performed by the information processing system 1 according to the present embodiment. FIG. 19 shows a graph 500 showing an acquired amount of manipulation information per unit time. The unit time is, when dividing the time from the start of distribution of live video to the end of distribution into a plurality of segments, the magnitude of the segments. The magnitude of the unit time is not particularly limited. In the present application example, the magnitude of the unit time, for example, may be approximately five seconds.

Referring to the graph 500, the acquired amount of manipulation information in each segment from the start of distribution of live video to the end of distribution is shown. The acquired amount of manipulation information is an acquired amount of manipulation information acquired by the manipulation information acquisition unit 102 in the segment.

For example, in segment slots 501 to 503 shown in the graph 500, the acquired amount is larger as compared to other segments. That is, it is considered that there were many manipulations made by users on the live video in these segment slots. Consequently, it can be considered that these segment slots are time slots in which users viewing the live video livened up. Thus, the image processing unit 104 may extract and bind live video in such time slots. Accordingly, it is possible to easily generate a highlight movie obtained by extracting livened-up portions alone in the live video.

Processing concerning generation of a highlight movie will be described below. Here, an example of generating a highlight movie by the image processing unit 104 after distribution of live video is finished will be described. Note that highlight movie generation processing may be carried out sequentially during distribution of live video. First, the image processing unit 104 acquires the acquired amount of manipulation information per unit time. Next, the image processing unit 104 determines whether or not the acquired amount in each segment exceeds a predetermined threshold value (in the graph 500 shown in FIG. 19, equivalent to a threshold line 510), and sets segment slots to be targeted for live video extraction. Then, the image processing unit 104 extracts respective pieces of live video in the segment slots targeted for extraction, and binds them so as to be temporally continuous to generate a highlight movie.

Note that, when binding a plurality of pieces of extracted live video, with respect to live video in two consecutive segments, the image processing unit 104 may perform image processing as appropriate with respect to before and after the terminal end time of live video in the former segment and the starting end time of live video in the latter segment. Specifically, the image processing unit 104 may perform such processing that a moving image corresponding to the terminal end time of live video in the former segment fades out and may perform such processing that a moving image corresponding to the starting end time of live video in the latter segment fades in. Since this can resolve discontinuity of a highlight movie caused by binding pieces of live video, it is possible to prevent a strange feeling from being created in viewing users.

<5.2. Polling Processing After Image Analysis>

Next, polling processing after an image analysis performed by the information processing system 1 will be described. This polling processing after an image analysis is to recognize an object to be targeted for polling through an image analysis, and perform polling processing for the recognized object using manipulation information.

Figure 20:
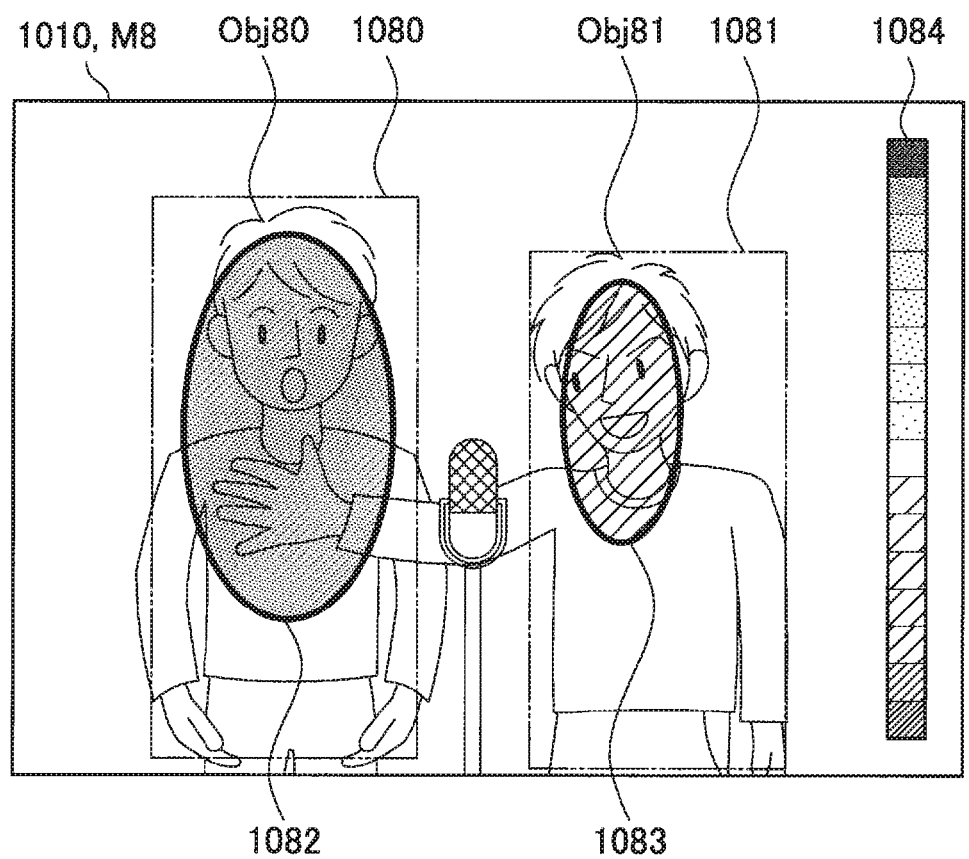
FIG. 20 is a diagram for describing an example of polling processing after an image analysis performed by the information processing system according to the embodiment.

FIG. 20 is a diagram for describing an example of polling processing after an image analysis performed by the information processing system 1 according to the present embodiment. Referring to FIG. 20, in the display manipulation unit 210 of the user terminal 30, live video M8 is displayed on the live video display screen 1010. A first human object Obj80 and a second human object Obj81 are included in this live video M8. These human objects are objects to be targeted for polling in the polling processing performed by the information processing system 1.

Here, it is assumed that such an instruction as to tap either the human object Obj80 or the second human object Obj81 has been presented to a viewing user on the live video M8. When the viewing user taps either a region 1080 corresponding to the human object Obj80 or a region 1081 corresponding to the second human object Obj81 on the user terminal 30, the manipulation information generation unit 203 generates manipulation information including a tapped position on the moving image, and the manipulation information transmission unit 204 transmits the manipulation information to the server 10.

The image analysis unit 103 recognizes the first human object Obj80 and the second human object Obj81 included in the live video M8, and the image processing unit 104 determines whether or not the tapped position included in manipulation information is included in a region corresponding to either the region 1080 corresponding to the human object Obj80 or the region 1081 corresponding to the second human object Obj81. Then, the image processing unit 104 specifies a corresponding object (or specifies that neither applies), and counts the number of tapping for the object. Processing as described above is carried out repeatedly for a predetermined time. Note that the predetermined time may be determined by the distribution user who distributes live video using the user terminal 20, or may be a time defined in advance or the like.

After the lapse of the predetermined time, the image processing unit 104 counts the total number of tapping corresponding to each object, and performs processing in accordance with a counted result. For example, as shown in FIG. 20, the image processing unit 104 may display the counted result like a heat map 1082 and a heat map 1083. The heat maps are subjected to image processing so as to be superimposed on the first human object Obj80 and the second human object Obj81, respectively. Note that a gauge 1084 indicating the degree that corresponds to the color of each heat map may be displayed on the live video M8. By displaying the counted result using the heat maps in this manner, users can understand the counted result intuitively. Note that the image processing unit 104 may present the counted result to users in various modes, not limited to the heat maps. For example, the image processing unit 104 may cause the numeric values of the counted result to be displayed on the live video M8, or may perform processing of displaying a predetermined effect on an object whose counted result is large (or small).

<5.3. Polling Processing After Image Analysis Based on Manipulation Position>

Next, polling processing after an image analysis based on a manipulation position performed by the information processing system 1 will be described. Different from the above-described polling processing after an image analysis, this polling processing after an image analysis based on a manipulation position is to recognize an object to be targeted for polling on the basis of manipulation information, and perform polling processing for the recognized object using the manipulation information.

Figure 21:
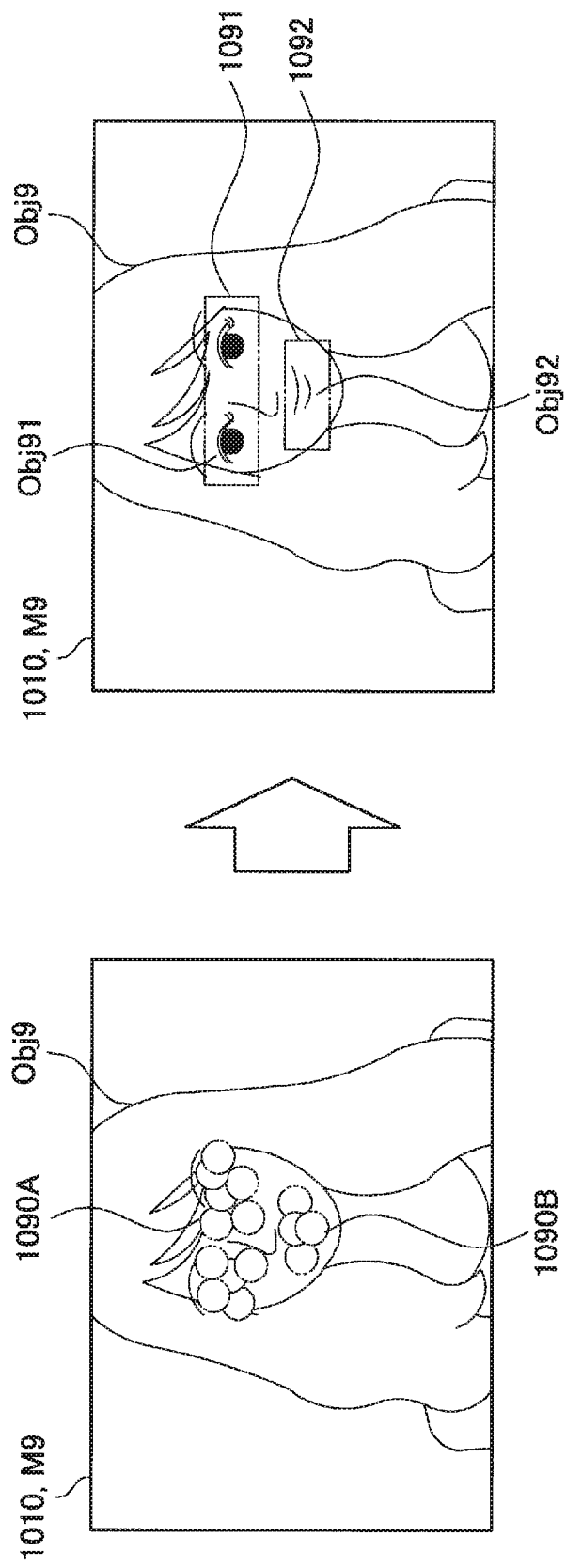
FIG. 21 is a diagram for describing an example of polling processing after an image analysis based on a manipulation position performed by the information processing system according to the embodiment.

FIG. 21 is a diagram for describing an example of polling processing after an image analysis based on a manipulation position performed by the information processing system 1 according to the present embodiment. Referring to FIG. 21, in the display manipulation unit 210 of the user terminal 30, live video M9 is displayed on the live video display screen 1010. A human object Obj90 is included in this live video M8.

Here, it is assumed that such an instruction as to tap either the eyes or the mouth of the human object Obj90 has been presented to a viewing user on the live video M9. When the viewing user taps the vicinity of either the eyes or the mouth of the human object Obj90 on the user terminal 30, the manipulation information generation unit 203 generates manipulation information including a tapped position on the moving image, and the manipulation information transmission unit 204 transmits the manipulation information to the server 10.

The image analysis unit 103 first analyzes the distribution of manipulation positions included in the manipulation information, and specifies a region to be targeted for polling processing on the basis of the distribution. In the example shown in FIG. 21, the image analysis unit 103 extracts a position group 1090A equivalent to the eyes of the human object Obj9 and a position group 1090B equivalent to the mouth of the human object Obj9 from positional information acquired from a plurality of user terminals 30. Then, the image analysis unit 103 recognizes an eye object Obj91 and a mouth object Obj92 of the human object Obj9 by analyzing the vicinity of these position groups, and specifies regions 1091 and 1092 corresponding to these objects. Accordingly, an image analysis by the image analysis unit 103 may be performed only for a range specified by the manipulation information, not for the entire moving image. Consequently, since the amount of calculation in the image analysis is reduced, a processing delay caused by the image analysis is less likely to occur, and user convenience can be ensured.

Note that, since processing (tapped position determination processing and counting processing) after specifying a region corresponding to an object is similar to the above-described polling processing performed by the image processing unit 104, description will be omitted.

<5.4. Movie Attribute Estimation>

Next, movie attribute estimation processing performed by the information processing system 1 will be described. This movie attribute estimation processing is, on the basis of manipulation information on a moving image, to estimate an attribute (category or the like) of the moving image.

FIG. 22 is a diagram for describing movie attribute estimation processing performed by the information processing system 1 according to the present embodiment. Referring to FIG. 22, a table 1100 including stickers and the number of tapping (the acquired amount of manipulation information) of stickers on live video is shown. This table 1100 shows the number of tapping of stickers within a predetermined time of one piece of live video. The predetermined time is any time between the start time of distribution of the live video and the end time of distribution. For example, the predetermined time may be a time from the start time of distribution to the present if live video is being distributed, or may be a time during which specific video is in a state of being distributed. Whether or not it is specific video may be determined on the basis of an image analysis performed by the image analysis unit 103, or may be determined by the distribution user who distributes the live video.

The image processing unit 104 may estimate an attribute of a moving image on the basis of manipulation information within a predetermined time. In the example shown in FIG. 22, it is shown that the number of tapping on the sticker "cat" is 450, the number of tapping on the sticker "heart" is 210, and the number of tapping on the sticker "Like" is 124. On the other hand, it is shown that the number of tapping on the sticker "food" is 23. From the above-described result, the image processing unit 104 may estimate that the live video is live video having an attribute related to "cat", "heart", and "Like" For example, the image processing unit 104 may estimate that an attribute of the live video is "animal-cat". Note that this movie estimation processing may be performed using a publicly-known technology concerning machine learning or the like, for example.

In this manner, when the image processing unit 104 estimates an attribute of a moving image on the basis of manipulation information, it is possible to automatically set an attribute of the moving image. Consequently, categorization of a moving image can be performed easily and with high accuracy.

<<6. Hardware Configuration Example>>

Figure 23:
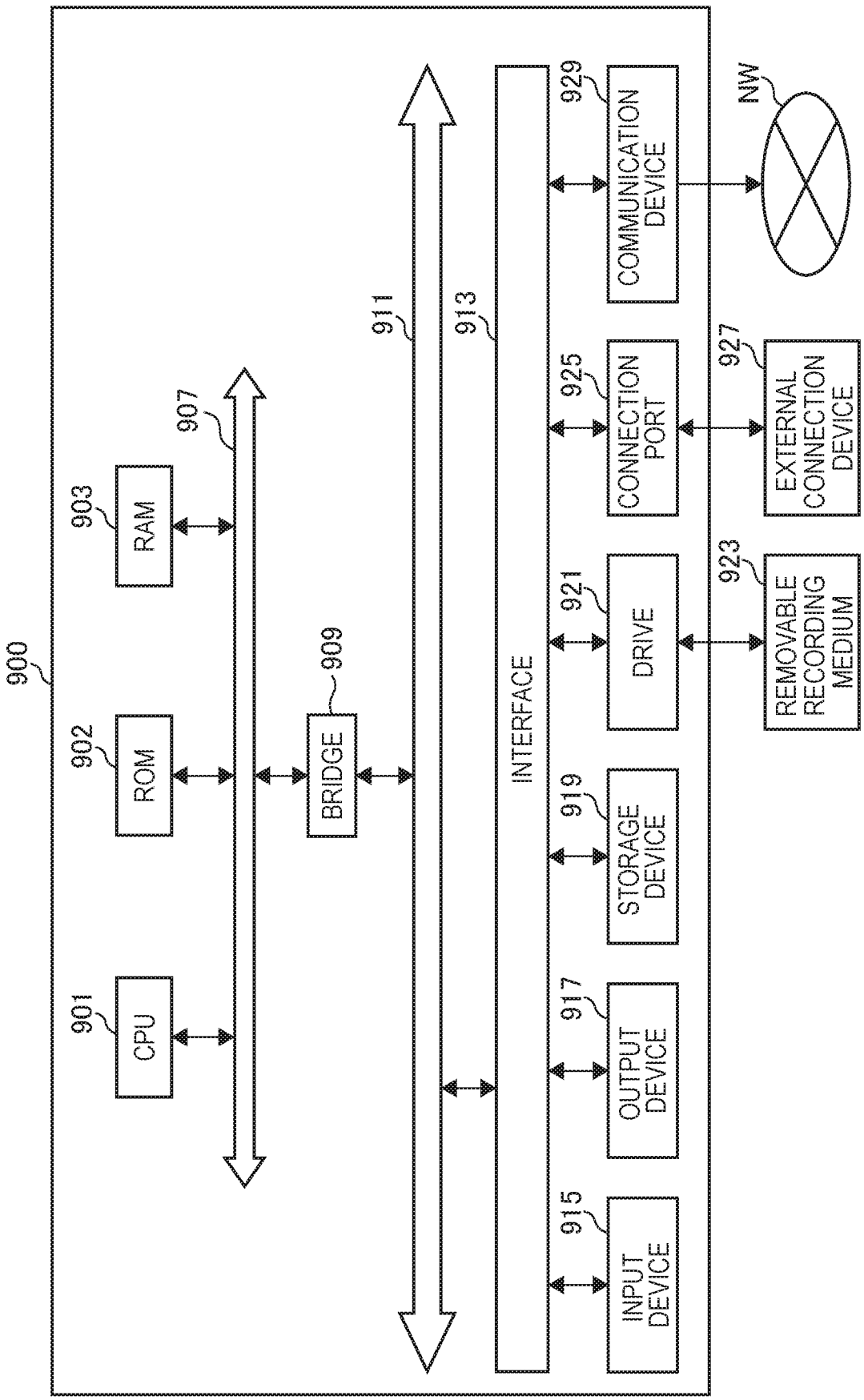
FIG. 23 is a block diagram showing a hardware configuration example of an information processing device according to an embodiment of the present disclosure.

An example of application of manipulation information performed by the information processing system 1 according to the present embodiment has been described above. Next, with reference to FIG. 23, a hardware configuration of an information processing device according to an embodiment of the present disclosure will be described. FIG. 23 is a block diagram showing a hardware configuration example of the information processing device according to an embodiment of the present disclosure. An illustrated information processing device 900 may implement the server 10 and the user terminal 20 (30) in the above-described embodiment, for example.

The information processing device 900 includes a CPU 901, a read only memory (ROM) 903, and a random access memory (RAM) 905. In addition, the information processing device 900 may include a host bus 907, a bridge 909, an external bus 911, an interface 913, an input device 915, an output device 917, a storage device 919, a drive 921, a connection port 925, and a communication device 929. Further, the information processing device 900 may include an imaging device (not shown) as needed. Furthermore, the information processing device 900 may include a processing circuit such as a digital signal processor (DSP) or an application specific integrated circuit (ASIC) instead of or in addition to the CPU 901.

The CPU 901 serves as an operation processing device and a control device, and controls the overall operation or a part of it in the information processing device 900 in accordance with various programs recorded in the ROM 903, the RAM 905, the storage device 919 or a removable recording medium 923. For example, the CPU 901 controls the overall operation of each functional unit included in the server 10 and the user terminal 20 (30) according to the above embodiment. The ROM 903 stores programs and operation parameters used by the CPU 901. The RAM 905 temporarily stores program used in the execution of the CPU 901 and parameters that changes as appropriate in the execution. The CPU 901, ROM 903, and RAM 905 are connected to each other by the host bus 907 including an internal bus such as a CPU bus. In addition, the host bus 907 is connected to the external bus 911 such as a peripheral component interconnect/interface (PCI) bus via the bridge 909.

The input device 915 is, for example, a device operated by a user with a mouse, a keyboard, a touch panel, buttons, switches, a lever, and the like. The input device 915 may be, for example, a remote control unit using infrared light or other radio waves, or may be an external connection device 927 such as a portable phone operable in response to the operation of the information processing device 900. The input device 915 includes an input control circuit that generates an input signal on the basis of the information input by a user and outputs the input signal to the CPU 901. By operating the input device 915, a user can input various types of data to the information processing device 900 or issue instructions for causing the information processing device 900 to perform a processing operation.

The output device 917 includes a device capable of visually or audibly notifying a user of the acquired information. The output device 917 may be, for example, a display device such as an LCD, a PDP, and an OELD, an audio output device, such as a speaker or a headphone, and a printer. The output device 917 outputs the results obtained from the process of the information processing device 900 in a form of video such as text or an image and sound such as audio.

The storage device 919 is a device for data storage configured as an example of a storage unit of the information processing device 900. The storage device 919 includes, for example, a magnetic storage device such as a hard disk drive (HDD), a semiconductor storage device, an optical storage device, or a magneto-optical storage device. The storage device 919 stores programs to be executed by the CPU 901, various data, and data obtained from the outside.

The drive 921 is a reader/writer for the removable recording medium 923 such as a magnetic disk, an optical disk, a magneto-optical disk, or a semiconductor memory, and is embedded in the information processing device 900 or externally attached thereto. The drive 921 reads the information recorded in the attached removable recording medium 923 and outputs the information to the RAM 905. Further, the drive 921 writes record in the attached removable recording medium 923.

The connection port 925 is a port used to directly connect devices to the information processing device 900. The connection port 925 may be, for example, a universal serial bus (USB) port, an IEEE1394 port, a small computer system interface (SCSI) port, or the like. In addition, the connection port 925 may be an RS-232C port, an optical audio terminal, High-Definition Multimedia Interface (HDMI) (registered trademark) port, or the like. By connecting the external connection device 927 to the connection port 925, various data may be exchanged between the information processing device 900 and the external connection device 927.

The communication device 929 is, for example, a communication interface including a communication device or the like for connection to the communication network NW. The communication device 929 may be, for example, a communication card for a wired or wireless local area network (LAN), Bluetooth (registered trademark), wireless USB (WUSB), or the like. In addition, the communication device 929 may be a router for optical communication, a router for asymmetric digital subscriber line (ADSL), a modem for various kinds of communications, or the like. The communication device 929 transmits and receives signals to and from, for example, the Internet or other communication devices using a predetermined protocol such as TCP/IP. In addition, the communication network NW to be connected to the communication device 929 is a network connected in a wired or wireless manner, and is, for example, the Internet, a home LAN, infrared communication, radio wave communication, satellite communication, or the like. Note that the communication device 929 may implements the function as a communication unit.

The imaging device (not shown) is a device that images real space using an imaging device such as a charge coupled device (CCD) or a complementary metal oxide semiconductor (CMOS), for example, and various members such as a lens for controlling image formation of a subject image on the imaging device, and generates a captured image. The imaging device may capture a still picture, or may capture a movie.

An example of a hardware configuration of the information processing device 900 has been shown above.

<<7. Summary>>

According to the information processing system 1 according to the present embodiment, the server 10 performs an image analysis on a moving image acquired from the user terminal 20 which is a distribution source on the basis of a manipulation position concerning location of a sticker acquired from the user terminal 30 and manipulation information including information concerning the sticker to be located. Then, the server 10 performs image processing on the moving image on the basis of an analysis result and the manipulation information. Then, the server 10 distributes the moving image having been subjected to the image processing to the user terminal 20 and the user terminal 30.

With such a configuration, a viewing user who views a moving image using the user terminal 30 can easily make communication with a plurality of users in real time while viewing the moving image by performing a predetermined manipulation such as a manipulation of locating a sticker on the moving image. Consequently, communication between users through the moving image becomes smoother.

In addition, according to the information processing system 1 according to the present embodiment, the server 10 performs processing other than the image processing, using the manipulation information acquired from the user terminal 30. For example, the server 10 performs statistical processing, extraction processing, or the like based on the manipulation information. With such a configuration, it is possible not only to process a moving image, but also to perform communication having a higher quantitative nature through the moving image. In addition, it is possible to easily generate a highlight movie concerning a moving image having been distributed.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiment, it has been described that an image analysis performed by the image analysis unit 103 and image processing performed by the image processing unit 104 are performed in the server 10, whilst the present technology is not limited to such an example. For example, the above-described image analysis and image processing may be performed in the user terminal 20 (30). More specifically, with respect to image processing, the user terminal 20 (30) may perform an image analysis and image processing on the basis of a moving image acquired by the user terminal 20 (30) from the server 10 and manipulation information acquired from another user terminal by way of the server 10. In this case, the server 10 transmits the moving image acquired from the user terminal 20 which is a distribution source of the moving image and the manipulation information acquired from the user terminal 20 (30) to the user terminal 20 (30). With such a configuration, since it is possible to distribute burdens related to an image analysis and image processing to the user terminal 20 (30), a processing burden on the server 10 is reduced. Consequently, delays caused by various types of processing can be less likely to occur.

Note that the respective functional units included in the server 10 according to the above-described embodiment may be provided separately in the server 10 and the user terminal 20 (30) in accordance with the specifications or system configurations of the server 10 and the user terminal 20 (30).

Further, the information processing system 1 according to the above-described embodiment has the server 10 and a plurality of user terminals 20 (30), whilst the present technology is not limited to such an example. For example, the information processing system may include the plurality of user terminals 20 (30) connected through a network. In this case, an image analysis and image processing on a distributed moving image may be carried out in each user terminal 20 (30) having acquired the moving image and manipulation information.

In addition, it is not always necessary to process the respective steps in processing in the server and a user terminal in the present specification in time series in the order described as a flowchart. For example, the respective steps in processing in the server and a user terminal may be processed in an order different from that described as a flowchart, or may be processed in parallel.

In addition, it is also possible to generate a computer program for causing hardware built in the server and a user terminal, such as a CPU, a ROM, and a RAM, to exert functions equivalent to those of the respective components of the above-described server and a user terminal. In addition, a recording medium having the computer program stored therein is also offered.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a communication unit configured to acquire a moving image being subjected to live distribution as well as manipulation information including a manipulation position concerning location of a sticker on the moving image being displayed on a display unit of a device and information concerning the sticker to be located; and a control unit configured to analyze a region corresponding to the manipulation position on the moving image, and perform processing of locating the sticker on the moving image on a basis of an analysis result and the manipulation information.

(2)

The information processing device according to (1), in which the control unit recognizes an object included in the region corresponding to the manipulation position, and performs image processing on the object.

(3)

The information processing device according to (2), in which the control unit changes a mode of the sticker to be located on the moving image on a basis of a characteristic of the object.

(4)

The information processing device according to (2) or (3), in which the control unit recognizes a motion of the object in the moving image, and performs further image processing on the moving image on a basis of the recognized motion of the object.

(5)

The information processing device according to (4), in which the control unit invalidates image processing applied to the moving image as the further image processing.

(6)

The information processing device according to (4) or (5), in which the control unit changes a position of the sticker located on the moving image as the further image processing.

(7)

The information processing device according to any one of (1) to (6) in which the control unit performs processing based on an acquired amount of the manipulation information.

(8)

The information processing device according to (7), in which the control unit performs processing based on a time-series distribution of the acquired amount of the manipulation information.

(9)

The information processing device according to (7) or (8), in which the control unit recognizes at least one object from the moving image, and performs processing based on the acquired amount of the manipulation information on the at least one object.

(10)

The information processing device according to any one of (7) to (9), in which the control unit recognizes at least one object on a basis of a distribution of the manipulation positions.

(11)

The information processing device according to any one of (7) to (10), in which the control unit sets an extraction segment of the moving image on a basis of a time-series distribution of the acquired amount.

(12)

The information processing device according to any one of (1) to (11), in which the control unit performs processing based on acoustic information corresponding to the moving image.

(13)

The information processing device according to any one of (1) to (12), in which the control unit estimates an attribute of the moving image on a basis of the manipulation information.

(14)

The information processing device according to any one of (1) to (13), in which on a basis of manipulation information concerning a manipulation on at least one sticker on the moving image, the control unit changes a mode of at least any of the stickers.

(15)

The information processing device according to (14), in which the control unit changes the mode of at least any of others of the stickers included in a region corresponding to at least one sticker located on the moving image.

(16)

The information processing device according to any one of (1) to (15), in which the manipulation information includes information concerning a manipulation mode on the display unit of the device.

(17)

The information processing device according to (16), in which the manipulation mode includes at least any of a tap manipulation, a pinch manipulation, a swipe manipulation, a sliding manipulation performed by at least one manipulation body, and a magnitude of a pressure applied to the display unit of the device.

(18)

The information processing device according to any one of (1) to (17), in which the control unit performs processing on the moving image.

(19)

An information processing method including:

by a processor, acquiring a moving image being subjected to live distribution;

acquiring manipulation information including a manipulation position concerning location of a sticker on the moving image being displayed on a display unit of a device and information concerning the sticker to be located;

analyzing a region corresponding to the manipulation position on the moving image; and performing processing of locating the sticker on the moving image on a basis of the analysis result and the manipulation information.

(20)

A program causing a computer to execute:

generating display information for causing a received moving image being subjected to live distribution to be displayed on a display unit of the computer;

generating manipulation information to be transmitted to a server by controlling a communication unit of the computer, the manipulation information including a manipulation position concerning location of a sticker on the moving image and information concerning the sticker to be located; and generating display information for causing a moving image received from the server by controlling the communication unit to be displayed on the display unit, the moving image having been subjected by the server to processing of locating the sticker on a basis of an analysis result obtained by analyzing a region on the moving image corresponding to a manipulation position acquired by the server from a device including the computer and the manipulation information.

REFERENCE SIGNS LIST 1 information processing system
10 server
20, 30 user terminal
101 image acquisition unit
102 manipulation information acquisition unit
103 image analysis unit
104 image processing unit
200 control unit
201 image acquisition unit
202 display control unit
203 manipulation information generation unit
204 manipulation information transmission unit
210 display manipulation unit
220 imaging unit

The invention claimed is:
1. An information processing device, comprising:
at least one processor configured to:
acquire, from a device, a moving image, manipulation information, and specific information, wherein
the moving image is subjected to live distribution,
the moving image is associated with acoustic information that includes a sound wave,
the acquired manipulation information includes a manipulation position corresponding to a location of a sticker on the moving image,
the moving image is displayed on a display screen of the device, and
the specific information corresponds to the sticker to be located;
analyze a region corresponding to the manipulation position on the moving image;
execute, based on the analyzed region and the acquired manipulation information, a first image processing operation to locate the sticker at a first position on the moving image,
wherein the first position of the located sticker overlaps an object in the moving image;
recognize a motion of the object in the moving image;
change the first position of the located sticker to a second position based on the recognized motion of the object in the moving image,
wherein the second position of the located sticker does not overlap the object in the moving image;
change a size of the located sticker based on a magnitude of the sound wave;
divide a time period corresponding to the moving image into a plurality of segments;
set, based on a time-series distribution of an amount of the acquired manipulation information, at least one segment of the plurality of segments as an extraction segment, wherein
the amount of the acquired manipulation information corresponds to a number of tapping operations on the moving image, and
the amount of the acquired manipulation information in the extraction segment is greater than a threshold value; and
generate a highlight movie image based on the extraction segment.

2. The information processing device according to claim 1, wherein the at least one processor is further configured to:
recognize the object in the region corresponding to the manipulation position; and
execute the first image processing operation on the object.

3. The information processing device according to claim 1, wherein the at least one processor is further configured to invalidate the first image processing operation based on the recognized motion of the object.

4. The information processing device according to claim 1, wherein the at least one processor is further configured to execute a second image processing operation based on the amount of the acquired manipulation information.

5. The information processing device according to claim 4, wherein the at least one processor is further configured to execute the second image processing operation based on the time-series distribution of the amount of the acquired manipulation information.

6. The information processing device according to claim 4, wherein the at least one processor is further configured to:
recognize the object from the moving image, and
execute the second image processing operation on the object based on the amount of the acquired manipulation information.

7. The information processing device according to claim 4, wherein the at least one processor is further configured to recognize the object based on a distribution of a plurality of manipulation positions.

8. The information processing device according to claim 1, wherein the at least one processor is further configured to estimate an attribute of the moving image based on the acquired manipulation information.

9. The information processing device according to claim 1, wherein
the at least one processor is further configured to change, based on the acquired manipulation information, a mode of a first sticker of a plurality of stickers located on the moving image, and
the first sticker is included in a region corresponding to a second sticker of the plurality of stickers.

10. The information processing device according to claim 1, wherein the acquired manipulation information corresponds to a manipulation mode on the display screen of the device.

11. The information processing device according to claim 10, wherein
the manipulation mode includes at least one of a tap manipulation, a pinch manipulation, a swipe manipulation, a sliding manipulation, or a magnitude of a pressure applied to the display screen of the device, and
the tap manipulation, the pinch manipulation, the swipe manipulation, and the sliding manipulation are executed by at least one manipulation body.

12. The information processing device according to claim 1, wherein the at least one processor is further configured to execute a second image processing operation on the moving image.

13. The information processing device according to claim 1, wherein the at least one processor is further configured to change the size of the located sticker based on the acquired manipulation information.

14. The information processing device according to claim 1, wherein the at least one processor is further configured to change a color of the located sticker based on the acquired manipulation information.

15. The information processing device according to claim 1, wherein the at least one processor is further configured to change an inclination of the located sticker based on the acquired manipulation information.

16. An information processing method, comprising:
in an information processing device that comprises at least one processor:
 acquiring, by the at least one processor, a moving image that is subjected to live distribution from a device,
  wherein the moving image is associated with acoustic information that includes a sound wave;
 acquiring, by the at least one processor, manipulation information including a manipulation position corresponding to a location of a sticker on the moving image,
  wherein the moving image is displayed on a display screen of the device;
 acquiring, by the at least one processor, specific information corresponding to the sticker to be located;
 analyzing, by the at least one processor, a region corresponding to the manipulation position on the moving image;
 executing, by the at least one processor based on the analyzed region and the acquired manipulation information, an image processing operation to locate the sticker at a first position on the moving image,
  wherein the first position of the located sticker overlaps an object in the moving image;
 recognizing, by the at least one processor, a motion of the object in the moving image;
 changing, by the at least one processor, the first position of the located sticker to a second position based on the recognized motion of the object in the moving image,
  wherein the second position of the located sticker does not overlap the object in the moving image;
 changing, by the at least one processor, a size of the located sticker based on a magnitude of the sound wave;
 dividing, by the at least one processor, a time period corresponding to the moving image into a plurality of segments;
 setting, by the at least one processor based on a time-series distribution of an amount of the acquired manipulation information, at least one segment of the plurality of segments as an extraction segment, wherein
  the amount of the acquired manipulation information corresponds to a number of tapping operations on the moving image, and
  the amount of the acquired manipulation information in the extraction segment is greater than a threshold value; and
 generating, by the at least one processor, a highlight movie image based on the extraction segment.

17. A non-transitory computer-readable medium having stored thereon, computer-executable instructions which when executed by a computer, cause the computer to execute operations, the operations comprising:
 generating first display information for display of a first moving image on a display screen of the computer,
  wherein the first moving image is associated with acoustic information that includes a sound wave;
 detecting a manipulation on the first moving image displayed on the display screen;
 generating manipulation information and specific information, based on the manipulation detected on the first moving image;
 transmitting the manipulation information and the specific information to a server, wherein
  the manipulation information includes a manipulation position corresponding to a location of a sticker on the first moving image, and
  the specific information corresponds to the sticker to be located on the first moving image;
 receiving a second moving image from the server;
 generating second display information for display of the second moving image on the display screen of the computer, wherein
  an image processing operation is executed on the first moving image, by the server, to locate the sticker at a first position on the first moving image based on an analysis result and the manipulation information, and
  the first position of the located sticker overlaps an object in the first moving image; and
 recognizing a motion of the object in the first moving image, wherein
  the analysis result is obtained by analyzing a region on the first moving image,
  the region corresponds to the manipulation position acquired by the server from the computer,
  a position of the located sticker is changed from the first position to a second position by the server based on the recognized motion of the object in the first moving image,
  the second position of the located sticker does not overlap the object in the first moving image,
  a size of the located sticker is changed by the server based on a magnitude of the sound wave,
  a time period corresponding to the first moving image is divided into a plurality of segments by the server,
  at least one segment of the plurality of segments is set, by the server, as an extraction segment based on a time-series distribution of an amount of the manipulation information,
  the amount of the manipulation information corresponds to a number of tapping operations on the first moving image,
  the amount of the manipulation information in the extraction segment is greater than a threshold value, and a highlight movie image is generated by the server based on the extraction segment.

\* \* \* \* \*